(12) United States Patent
Yumoto et al.

(10) Patent No.: US 6,610,216 B2
(45) Date of Patent: Aug. 26, 2003

(54) OPTICALLY ACTIVE COMPOUND, PHOTOREACTIVE CHIRAL AGENT, LIQUID CRYSTAL COMPOSITION, METHOD FOR CHANGING HELICAL STRUCTURE OF LIQUID CRYSTAL, METHOD FOR FIXING HELICAL STRUCTURE OF LIQUID CRYSTAL, LIQUID CRYSTAL COLOR FILTER, OPTICAL FILM, AND RECORDING MEDIUM

(75) Inventors: Masatoshi Yumoto, Shizuoka-ken (JP); Keiichiro Hayashi, Shizuoka-ken (JP); Mitsuyoshi Ichihashi, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 41 days.

(21) Appl. No.: 10/013,463

(22) Filed: Dec. 13, 2001

(65) Prior Publication Data

US 2003/0006398 A1 Jan. 9, 2003

(30) Foreign Application Priority Data

Dec. 14, 2000 (JP) .................................. 2000-381003
Dec. 4, 2001 (JP) .................................. 2001-370106

(51) Int. Cl.⁷ .................. C09K 19/52; C09K 19/30; C09K 19/32; C09K 19/38; C07D 321/10; C07D 319/06
(52) U.S. Cl. .................. 252/299.01; 252/299.61; 252/299.62; 549/375; 549/348; 428/1.1
(58) Field of Search .................. 252/299.01, 299.61, 252/299.62; 549/374, 375, 382, 348; 430/20, 19; 349/2, 179, 80, 106; 428/1.1

(56) References Cited

U.S. PATENT DOCUMENTS 6,319,963 B1 * 11/2001 Coates et al. .................. 522/1

FOREIGN PATENT DOCUMENTS

| DE | 4342280 | * | 6/1995 |
| JP | 2001-303057 | * | 10/2001 |
| JP | 2001-305329 | * | 10/2001 |
| WO | WO 00/34808 A1 | | 6/2000 |

OTHER PUBLICATIONS

H.-J. Deuben, et al.; "New 6,6'–disubstituted–binaphthol derivatives as chiral dopants: Synthesis and temperature dependence of molecular conformations"; Liquid Crystals; 1996; vol. 21; No. 3; pp. 327–340.

A. Ferrarini, et al.; "Twisting power of bridged binaphthol derivatives: comparison of theory and experiment"; Liquid Crystal; 1998; vol. 24; No. 2; pp. 219–227.

* cited by examiner

Primary Examiner—Shean C. Wu
(74) Attorney, Agent, or Firm—Sughrue Mion, PLLC

(57) ABSTRACT

The present invention provides an optically active compound represented by the following general formula (1), a photoreactive chiral agent, a liquid crystal composition, a liquid crystal color filter, an optical film, and a recording medium which include the optically active compound.

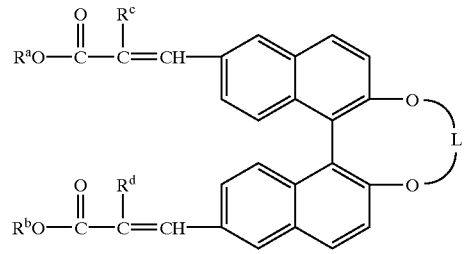

wherein, $R^a$ and $R^b$ each independently denotes a hydrogen atom, an alkyl group, an aryl group, a heterocyclic group, an alkenyl group, or an alkynyl group, $R^c$ and $R^d$ each independently denotes a hydrogen atom, an alkyl group, or an alkoxycarbonyl group, and L denotes a divalent group and a binaphtyl portion has an axial asymmetry of either (R) or (S).

13 Claims, 3 Drawing Sheets ns and color reproduction. In
OPTICALLY ACTIVE COMPOUND, PHOTOREACTIVE CHIRAL AGENT, LIQUID CRYSTAL COMPOSITION, METHOD FOR CHANGING HELICAL STRUCTURE OF LIQUID CRYSTAL, METHOD FOR FIXING HELICAL STRUCTURE OF LIQUID CRYSTAL, LIQUID CRYSTAL COLOR FILTER, OPTICAL FILM, AND RECORDING MEDIUM

BACKGROUND OF THE INVENTION

1. Field of the Invention

The present invention relates to a novel optically active compound, a photoreactive chiral agent for changing the helical structure of a liquid crystal, a liquid crystal composition, an optical film, a liquid crystal color filter, a recording medium, a method for changing the helical structure of a liquid crystal, and a method for fixing the helical structure.

2. Description of the Related Art

Recently, attention has been paid to a liquid crystal material such as a cholesteric liquid crystal which has a helical structure, and shows a variety of selectively reflected colors due to the helical twisting power (twist angle) of the helix. Furthermore, since the material is excellent in terms of the selective reflection property and the color purity of the selective reflection light, it is used widely for an optical filter, a liquid crystal color filter, a recording medium, or the like.

For example, a color filter used in a color liquid crystal display, or the like, is generally comprised of red (R), green (G), and blue (B) pixels, and a black matrix for improving the display contrast between the pixels. This type of color filter is conventionally one having a pigment dispersed in a resin, or one in which a dye is used. Methods for producing the color filter are usually applied in which a colored resin liquid is coated on a glass substrate by spin coating, or the like to thereby form a colored resist layer and patterning by a photolithography process is then carried out to form a color filter pixel, or a colored pixel is directly printed on a substrate.

However, in the manufacturing method of a color filter using a printing method, there are drawbacks in that the pixel resolution is low and it is difficult to produce a high resolution image pattern. In the manufacturing method using the spin coat method, there is a large amount of material loss, and in the case where a substrate having a large area is coated, there is the disadvantage that unevenness of the coat is large. Further, in a method of manufacturing using an electrodeposition method, a color filter can be obtained which has a comparatively high resolution and the uneveness of the color layer is relatively small, but there are problems with this method since the manufacturing process is complicated and managing the solutions is difficult.

From the above-mentioned reasons, there is demand for a method of producing a color filter in which a high quality color filter can be efficiently and easily produced with little material loss.

On the other hand, the color filter is required to have high transmittance and high color purity. Recently, improvement of color purity and transmittance have been achieved by optimizing the kind of the dye or the coloring resin. Also, in a method using a pigment, transmittance and purity may be improved by using a fine pigment which is thoroughly dispersed. However, recently the demand for the transmittance and the color purity of the color filter in a liquid crystal display (LCD) panel has been extremely high. In particular, in the case of a color filter for a reflection type LCD, it is difficult to simultaneously realize a degree of whiteness like paper white, high contrast and color reproduction. In contrast, in the case of a color filter produced by coloring a resin with a dye, or by dispersing a pigment in a conventional production method, since both are a light absorbing type color filters, improvement of the color purity by further improving the transmittance has substantially reached to the limit.

A color filter which was polarized light and has a cholesteric liquid crystal as the main component is known. Since this type of color filter displays an image by reflecting a predetermined amount of light and transmitting the rest, the efficiency of light use is high and performance in terms of the transmittance and color purity is superior to that of the light absorbing type color filter. On the other hand, from the viewpoint of obtaining even thickness, a method of forming a film on a substrate using a spin coat process, or the like has been commonly used as the production method therefor. However, in this method, there is a large amount of material loss, and thus it is disadvantageous in terms of the cost.

As a means for solving the above-mentioned problems and for ensuring uniformity in the color filter film (e.g. uniform color purity), and further in order to realize reduction of the number of production steps, a method of using a photoreactive chiral compound is useful. This method is based on the principle that when a liquid crystal composition including a photoreactive chiral compound is irradiated so as to form a pattern with light of the reactive wavelength of the chiral compound, since the reaction of the chiral compound proceeds in accordance with the intensity of the radiation energy so as to change the helical pitch (twist angle of the helix) of the liquid crystal compound, a selectively reflected color is formed for each pixel just by pattern exposure of differing light amounts. That is, this method is advantageous in that the many patternings for the color filter formation can be completed by carrying out mask exposure only once using masks with different transmissible light amounts.

Therefore, by fixing a cholesteric liquid crystal compound after image-wise irradiation of light and patterning, a film capable of functioning as a color filter can be formed. This can also be applied for an optical film, an image recording, or the like.

In particular, in the case of producing a color filter by carrying out mask exposure once, it is desired that the three primary colors which are B (blue), G (green), and R (red) are formed with a good color purity by carrying out exposure only once. However, when the liquid crystal twist change rate is small, a sufficient color purity cannot be obtained. Therefore, from the viewpoint of displaying the three primary colors with a high color purity by carrying out exposure once, it is necessary to use as a photoreactive chiral compound a chiral compound (chiral agent) having a large twist change rate, and capable of significantly changing the helical twisting power of the helical structure of the liquid crystal compound. That is, by using a chiral compound having a large twist change rate, the range of the hues which display selective reflection can be expanded by changing the radiation amount.

The present inventor has applied a photoreactive chiral agent (optically active compound) whose photoreactivity is such that it is capable of changing the liquid crystal helical twisting power (twist angle) in accordance with the amount of light irradiated. Further the helical twisting power (twist angle) change ratio is large and thus a wide range of a wavelength region is capable of various selective reflection particularly in the case of a cholesteric liquid crystal phase. This photoreactive chiral agent is also capable of displaying the three primary colors (B, G, R) with a high color purity (Japanese Patent Application Nos. 2000-193142, 2000-193143). However, development of other different types of chiral compounds has been anticipated.

According to <21>, page 327 of "Liquid Crystals" 1996, and <24>, page 219 of the same 1998, the HTP (helical twisting power) can be enlarged by introducing a substituent at the 6th position and the 6'th position of a 2,2'-methylenedioxy-1,1'-binaphthol. However, the substituents at the 6th position and the 6'th position have a structure different from those of the substituents at the 6th position and the 6'th position of an optically active compound of the present invention which is described later. Moreover, no description is given therein of photoreactivity.

SUMMARY OF THE INVENTION

The present invention has been achieved in view of the above-mentioned problems with the conventional products. An object thereof is to provide: an optically active compound useful as a photoreactive chiral agent which is capable of the photoisomeriation and significantly changing the helical structure (or helical twisting power, twist angle) of the liquid crystal by the light irradiation when it is added to a liquid crystal compound; a photoreactive chiral agent including the above-mentioned optically active compound; a liquid crystal composition with the above-mentioned optically active compound added; a liquid crystal color filter; an optical film; and a recording medium. Furthermore, another object of the present invention is to provide a method for changing the helical structure of the liquid crystal of a liquid crystal composition including the above-mentioned optically active compound, and a method for fixing the helical structure.

A first aspect of the present invention is an optically active compound represented by the general formula (1).

general formula (1)

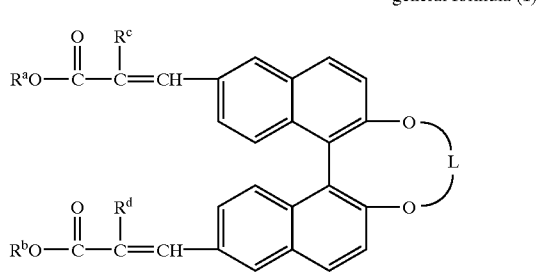

(wherein, $R^a$ and $R^b$ each independently denotes a hydrogen atom, an alkyl group, an aryl group, a heterocyclic group, an alkenyl group, or an alkynyl group, $R^c$ and $R^d$ each independently denotes a hydrogen atom, an alkyl group, or an alkoxycarbonyl group, and L denotes a divalent group. A binaphtyl portion has an axial asymmetry of either (R) or (S).)

Moreover, a second aspect of the present invention is a photoreactive chiral agent including the above-mentioned optically active compound.

Furthermore, a third aspect of the present invention is a liquid crystal composition containing at least a liquid crystal compound and the above-mentioned optically active compound.

Moreover, a fourth aspect of the present invention is a liquid crystal composition containing a liquid crystal compound having at least one polymerizable group, a photo polymerization initiator, and the above-mentioned optically active compound.

Furthermore, a fifth aspect of the present invention is a method for changing the helical structure of the liquid crystal by changing the structure of the above-mentioned optically active compound by irradiating a light to the liquid crystal composition according to the above-mentioned third or fourth aspect.

Moreover, a sixth aspect of the present invention is a method for fixing the helical structure of the liquid crystal comprising the steps of image-wise irradiating light of the photosensitive wavelength region of the above-mentioned optically active compound to the liquid crystal composition according to the fourth aspect, and irradiating light of the photosensitive wavelength region of the above-mentioned photo polymerization initiator so as to carry out the photo polymerization.

A seventh aspect of the present invention is a liquid crystal color filter containing at least a liquid crystal compound and at least one of the above-mentioned optically active compounds.

An eighth aspect of the present invention is an optical film containing at least a liquid crystal compound and at least one of the above-mentioned optically active compounds.

A ninth aspect of the present invention is a recording medium containing at least a liquid crystal compound and at least one of the above-mentioned optically active compounds.

DETAILED DESCRIPTION OF THE PREFERRED EMBODIMENTS

Figure 1A:
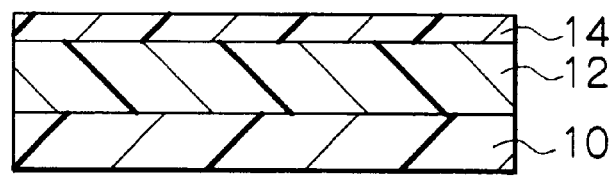
FIGS. 1A to 1I are cross-sectional views showing production steps of a liquid crystal color filter according to the present invention.

Hereinafter, the present invention will be explained successively in detail.

Optically Active Compound

An optically active compound of the present invention is a compound represented by the following general formula (1).

general formula (1)

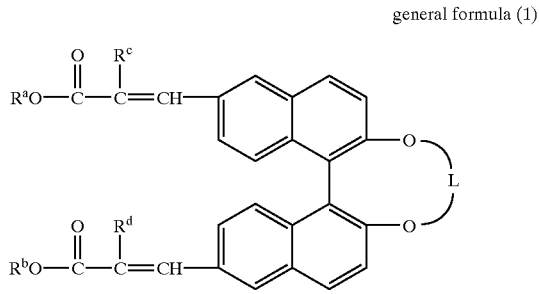

Since the above-mentioned optically active compound of the present invention has an optical isomerization group in the molecule, it is capable of optical isomerization. It is a compound useful as a photoreactive chiral agent capable of significantly changing the helical structure (helical twisting power, twist angle) of the liquid crystal due to light irradiation when it is added to a liquid crystal. Moreover, it can be used as an ordinary optically active compound, and thus it can be adopted as a helical structure inducing agent in an STN element or a TN element.

In the general formula (1), $R^a$ and $R^b$ each independently denotes a hydrogen atom, an alkyl group, an aryl group, a heterocyclic group, an alkenyl group, or an alkynyl group, $R^c$ and $R^d$ each independently denotes a hydrogen atom, an alkyl group, or an alkoxycarbonyl group, and L denotes a divalent group. A binaphtyl portion has an axial asymmetry of either (R) or (S).

The alkyl group represented by $R^a$ or $R^b$ may have a substituent. An alkyl group having a total of 1 to 30 carbon atoms is preferable, and an alkyl group having 1 to 20 carbon atoms is particularly preferable. As the substituent, a halogen atom, an aryl group, an alkenyl group, an alkynyl group, an alkoxy group, an acyl group, an alkoxycarbonyl group, an aryloxycarbonyl group, an acyloxy group, and a cyano group are preferable. Among these examples, a halogen atom, an alkoxy group and an acyloxy group are particularly preferable.

Examples of the alkyl groups include a methyl group, a pentyl group, a cyclohexyl group, a trifluoromethyl group, a benzyl group, an allyl group, a methoxyethyl group, an acetyloxymethyl group, and the like.

The aryl group represented by $R^a$ or $R^b$ may have a substituent. An aryl group having a total of 6 to 40 carbon atoms is preferable, and an aryl group having 6 to 30 carbon atoms is particularly preferable. As the substituent, a halogen atom, an alkyl group, an alkenyl group, an alkynyl group, an alkoxy group, an acyl group, an alkoxycarbonyl group, an aryloxycarbonyl group, an acyloxy group, and a cyano group are preferable. Among these examples, a halogen atom, an alkyl group, an alkenyl group, an alkoxy group and an acyloxy group are particularly preferable.

Examples of the aryl groups include a phenyl group, a β-naphthyl group, a 4-methylphenyl group, a 4-vinylphenyl group, a 4-butyloxyphenyl group, a 4-benzoyloxyphenyl group, or the like.

The heterocyclic group represented by $R^a$ or $R^b$ may have a substituent. A heterocyclic group having a total of 4 to 40 carbon atoms is preferable, and a heterocyclic group having 4 to 30 carbon atoms is particularly preferable. As the substituent, a halogen atom, an alkyl group, an alkenyl group, an alkynyl group, an alkoxy group, an acyl group, an alkoxycarbonyl group, an aryloxycarbonyl group, an acyloxy group, and a cyano group are preferable. Among these examples, a halogen atom, an alkyl group, an alkenyl group, an alkoxy group and an acyloxy group are particularly preferable.

As an example of the heterocyclic groups, a pyridyl group, a pyrimidinyl group, a furyl group, and a benzofuranyl group are preferable. In particular, a pyridyl group, and a pyrimidinyl group (2-pyrimidinyl group, or the like) are preferable.

The alkenyl group represented by $R^a$ or $R^b$ may have a substituent. An alkenyl group having a total of 2 to 30 carbon atoms is preferable, and an alkenyl group having 2 to 20 carbon atoms is particularly preferable. As the substituent, a halogen atom, an aryl group, an alkynyl group, an alkoxy group, an acyl group, an alkoxycarbonyl group, an aryloxycarbonyl group, an acyloxy group, and a cyano group are preferable. Among these examples, an aryl group, an alkoxy group and an acyloxy group are particularly preferable.

Examples of the alkenyl group include a vinyl group, a phenylethenyl group, a 4-pentyloxyphenylethenyl group, a methoxyvinyl group, and the like.

The alkynyl group represented by $R^a$ or $R^b$ may have a substituent. An alkynyl group having a total of 2 to 30 carbon atoms is preferable, and an alkynyl group having 2 to 20 carbon atoms is particularly preferable. As the substituent, a halogen atom, an aryl group, an alkenyl group, an alkoxy group, an acyl group, an alkoxycarbonyl group, an aryloxycarbonyl group, an acyloxy group, and a cyano group are preferable. Among these examples, an aryl group and an acyloxy group are particularly preferable.

Examples of the alkynyl group include an ethynyl group, a phenylethynyl group, a 4-acetyloxyphenyl ethynyl group, and the like.

Moreover, $R^a$ and $R^b$ in the general formula (1) may further be substituted by a group represented by the structural formula shown below:

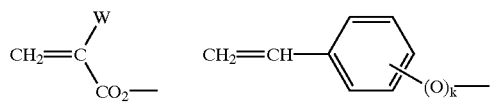

W:H or $CH_3$, k:0 or 1

Among the groups represented by $R^a$ and $R^b$, an alkyl group and an aryl group are particularly preferable. Furthermore, it is preferable that $R^a$ and $R^b$ are the same group.

The alkyl group represented by $R^c$ or $R^d$ may have a substituent. An alkyl group having a total of 1 to 30 carbon atoms is preferable, and an alkyl group having 1 to 20 carbon atoms is particularly preferable. As the substituent, a halogen atom, an aryl group, an alkenyl group, an alkynyl group, an alkoxy group, an acyl group, an alkoxycarbonyl group, an aryloxycarbonyl group, an acyloxy group, and a cyano group are preferable. Among these examples, a halogen atom, an alkoxy group and an alkoxycarbonyl group are particularly preferable.

Examples of the alkyl group include a methyl group, a pentyl group, a cyclohexyl group, a trifluoromethyl group, a benzyl group, an allyl group, a methoxyethyl group, an ethoxycarbonylmethyl group, and the like.

The alkoxycarbonyl group represented by $R^c$ or $R^d$ may have a substituent. An alkoxycarbonyl group having a total of 2 to 30 carbon atoms is preferable, and an alkoxycarbonyl group having 2 to 20 carbon atoms is particularly preferable. As the substituent, a halogen atom, an aryl group, an alkenyl group, an alkynyl group, an alkoxy group, an acyl group, an aryloxycarbonyl group, an acyloxy group, and a cyano group are preferable. Among these examples, a halogen atom, an aryl group and an alkoxy group are particularly preferable.

Examples of the alkoxycarbonyl group include a methoxycarbonyl group, a decyloxycarbonyl group, a trifluoroethoxycarbonyl group, a methoxyethoxycarbonyl group, an acetyloxyethoxycarbonyl group, and the like.

Among the groups represented by $R^c$ and $R^d$, a hydrogen atom, and an unsubstituted alkyl group are preferable, and a hydrogen atom is particularly preferable. Furthermore, it is preferable that $R^c$ and $R^d$ are the same group.

L is a divalent group, which may have a substituent. One having a total of 1 to 30 carbon atoms is preferable, and one having 1 to 20 carbon atoms is particularly preferable. Examples of the divalent group are an alkylene group, and a divalent group represented by the structural formula shown below.

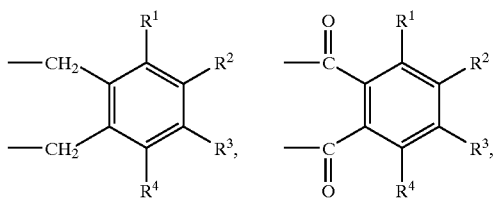

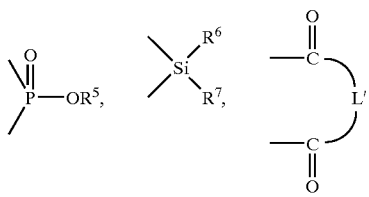

In the structural formula, $R^1$ to $R^4$ each independently denotes a hydrogen atom, a halogen atom, an alkyl group, an aryl group, an alkoxy group, an alkoxycarbonyl group, an aryloxycarbonyl group, an acyloxy group, or an acylamino group, $R^5$ denotes an alkyl group, or an aryl group, and $R^6$ and $R^7$ each independently denotes an alkyl group, an aryl group, or an alkenyl group. L' denotes a divalent group other than a phenylene group.

Moreover, the alkylene group and $R^1$ to $R^7$ may further be substituted by a group represented by another substituent. The substituent may be one represented by the structural formula shown below:

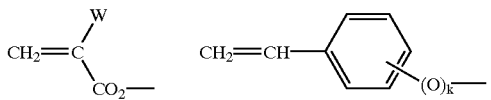

W:H or $CH_3$, k:0 or 1

Among the groups represented by L, those particularly preferable are the following groups:

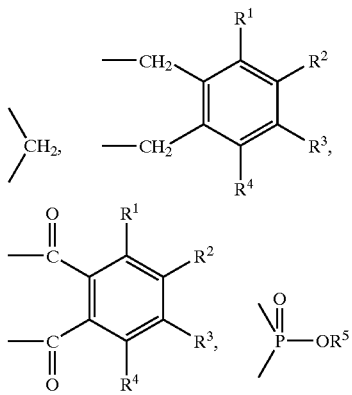

Hereinafter, specific examples of the optically active compounds represented by the general formula (1) of the present invention will be presented, but the present invention is not limited thereto.

TABLE 1

| No. | —R | Axial asymmetry of the binaphthyl |
|---|---|---|
| 1-1 | —$CH_3$ | R |
| 1-2 | —$C_2H_5$ | S |
| 1-3 | cyclohexyl | R |
| 1-4 | menthyl | S |
| 1-5 | cyclohexyl-phenyl | S |
| 1-6 | phenyl | R |
| 1-7 | biphenyl-OCH$_3$ | S |
| 1-8 | substituted cyclohexanone | R |
| 1-9 | naphthyl | R |
| 1-10 | —$C_{18}H_{37}(n)$ | S |
| 1-11 | —$CH_2CH=CH_2$ | S |
| 1-12 | norbornyl | S |

TABLE 2

[Structure: binaphthyl with methylenedioxy bridge and two RO-C(=O)-CH=CH- substituents]

| No. | —R | Axial asymmetry of the binaphthyl |
|---|---|---|
| 1-13 | (bornyl group with CH₃, CH₃, CH₃) | R |
| 1-14 | —CH$_2$C$_2$F$_5$ | R |
| 1-15 | (diacetone sugar derivative) | S |
| 1-16 | (diacetone sugar derivative) | R |
| 1-17 | —C$_6$H$_4$—C$_4$H$_9$(t) | S |
| 1-18 | (2-chlorophenyl) | R |
| 1-19 | (2,4-dimethyl-isopropylphenyl) | S |

TABLE 3

[Structure: binaphthyl with methylenedioxy bridge and two RO-C(=O)-CH=CH- substituents]

| No. | —R | Axial asymmetry of the binaphthyl |
|---|---|---|
| 1-20 | (phenanthrenyl-methyl) | R |
| 1-21 | —C$_6$H$_4$—CO$_2$C$_{10}$H$_{21}$(n) | S |
| 1-22 | —C$_6$H$_4$—CO$_2$(CH$_2$)$_2$OH | S |
| 1-23 | —C$_6$H$_4$—CO$_2$(CH$_2$)$_2$OCCH=CH$_2$ (with C=O) | S |
| 1-24 | —CH$_2$—C$_6$H$_5$ | R |
| 1-25 | (9H-fluoren-9-yl) | R |

TABLE 4

| No. | —R | Axial asymmetry of the binaphthyl |
|---|---|---|
| 1-26 | —C₂H₅ | R |
| 1-27 | —C₆H₄—C≡C—C₆H₅ | S |
| 1-28 | 5,6,7,8-tetrahydronaphthalen-1-yl | S |
| 1-29 | —C₆H₄—C₆H₅ (biphenyl) | R |

TABLE 4-continued

| No. | —R | Axial asymmetry of the binaphthyl |
|---|---|---|
| 1-30 | —C₆H₄—CHO | R |
| 1-31 | —C₆H₄—CH=CH—CO₂CH₃ | R |
| 1-32 | —C₆H₄—CH=C(CO₂CH₃)(CN) | R |
| 1-33 | —C₆H₄—CH=C(CN)₂ | R |

TABLE 5

| No. | —R | —R⁵ | Axial asymmetry of the binaphthyl |
|---|---|---|---|
| 1-34 | —C₂H₅ | —C₂H₅ | R |
| 1-35 | —C₆H₄—C₆H₄—OC₄H₉ | —(CH₂)₂OCOCH=CH₂ | R |

TABLE 5-continued

[Structure: binaphthyl with phosphate group bearing OR⁵, and two RO-CO-CH=CH- substituents at the 6,6' positions]

| No. | —R | —R⁵ | Axial asymmetry of the binaphthyl |
|---|---|---|---|
| 1-36 | [4-methylphenyl]—CH=CH—CO₂H | —C₆H₁₃(n) | S |
| 1-37 | [4-methylcyclohexyl]— | [4-methylphenyl]—CO₂(CH₂)₂OCCH=CH₂ (with C=O) | R |
| 1-38 | [1-methylnaphthyl]— | —(CH₂)₉OC(O)CH=CH₂ | S |
| 1-39 | CH₃O—[phenyl]—OCCH=CH— (both R groups); R⁵ portion: —OCH₂—[phenyl]—[phenyl]—CH₂O— bridging (binaphthyl with o-xylylene bridge) | | |
| 1-40 | (CH₃)₂CHCH₂OCCH=CH— (both R groups); binaphthyl 2,2'-diester of 4-(methoxycarbonyl)phthalic acid | | |

TABLE 6

[Structure: binaphthyl with two ethyl cinnamate groups connected via -O-L-O- linker]

| No. | -L- | Axial asymmetry of the binaphthyl |
|---|---|---|
| 1-41 | —CH₂CH₂— | S |
| 1-42 | —CH₂CH₂CH₂— | R |
| 1-43 | —CH(CH₃)—CH₂— | R |
| 1-44 | -C(=O)-C₆H₄-C(=O)- (ortho) | S |
| 1-45 | —CH₂—CH(CH₂OC(=O)C(CH₃)=CH₂)— | S |
| 1-46 | —CH₂—(C₆H₃-OCH₃)—CH₂— | R |
| 1-47 | -C(=O)-(C₆H₂Cl₂)-C(=O)- | R |
| 1-48 | —Si(CH₃)(C₆H₅)(C₆H₅)— (dimethyldiphenylsilyl—shown as Si with two phenyls) | S |
| 1-49 | -C(=O)-(cyclohexyl)-C(=O)- | R |

TABLE 7

[Structure: binaphthyl with two ethyl cinnamate groups connected via -O-L-O- linker]

| No. | -L- | Axial asymmetry of the binaphthyl |
|---|---|---|
| 1-50 | -C(=O)-CH=CH-C(=O)- | R |
| 1-51 | -C(=O)-(biphenyl-2,2')-C(=O)- | R |
| 1-52 | -C(=O)-(naphthalene-1,8)-C(=O)- | S |

TABLE 8

[Structure: binaphthyl with two ethyl ester-substituted cinnamate groups (with Rᶜ and Rᵈ substituents) connected via -O-L-O- linker]

| No. | —Rᶜ | —Rᵈ | -L- | Axial asymmetry of the binaphthyl |
|---|---|---|---|---|
| 1-53 | —CH₃ | —CH₃ | —CH₂— | R |

TABLE 8-continued

| No. | —R$^c$ | —R$^d$ | -L- | Axial asymmetry of the binaphthyl |
|---|---|---|---|---|
| 1-54 | —CH$_3$ | —CH$_3$ | (phthaloyl) | R |
| 1-55 | —CO$_2$C$_2$H$_5$ | —CO$_2$C$_2$H$_5$ | —CH$_2$— | S |
| 1-56 | —CO$_2$C$_2$H$_5$ | —CO$_2$C$_2$H$_5$ | (phthaloyl) | S |
| 1-57 | —H | —CH$_3$ | —CH$_2$— | R |

TABLE 9

| No. | —R$^a$ | —R$^b$ | -L- | Axial asymmetry of the binaphthyl |
|---|---|---|---|---|
| 1-58 | —CH$_3$ | —C$_2$H$_5$ | —CH$_2$— | R |
| 1-59 | —C$_2$H$_5$ | —C$_4$H$_9$ | —CH$_2$— | S |
| 1-60 | —C$_3$H$_7$ | —C$_2$H$_5$ | (phthaloyl) | R |

Production Method

An optically active compound represented by the general formula (1) can be produced by using the reaction in the following reaction formula:

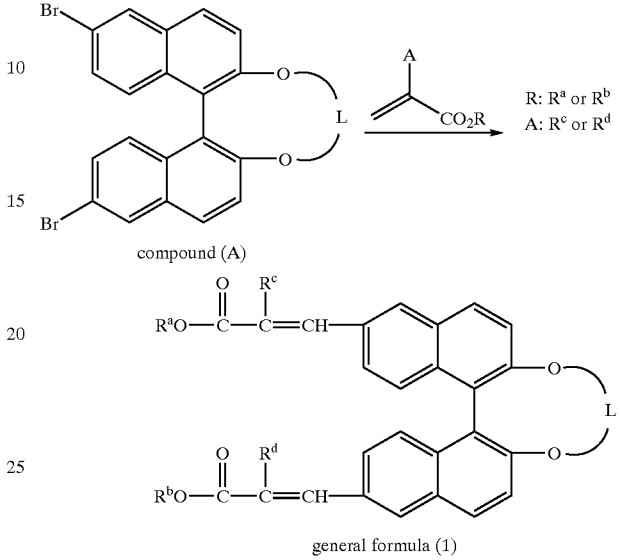

Formula 1 compound (A)
general formula (1)

R: R$^a$ or R$^b$
A: R$^c$ or R$^d$

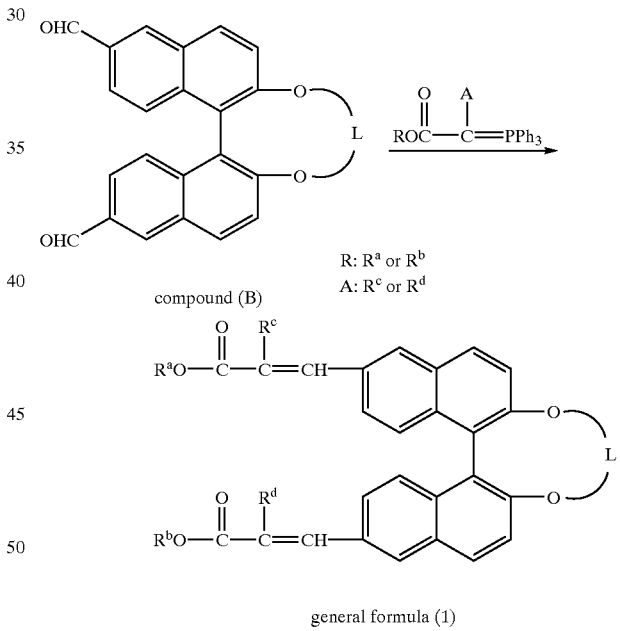

Formula 2 compound (B)
general formula (1)

R: R$^a$ or R$^b$
A: R$^c$ or R$^d$

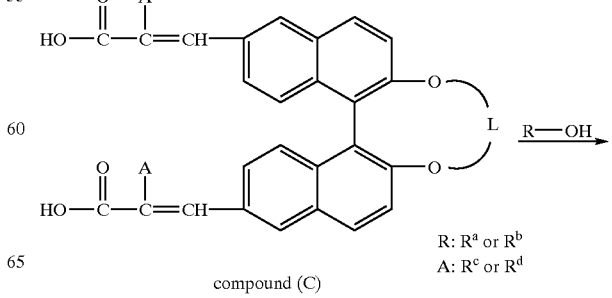

Formula 3 compound (C)

R: R$^a$ or R$^b$
A: R$^c$ or R$^d$

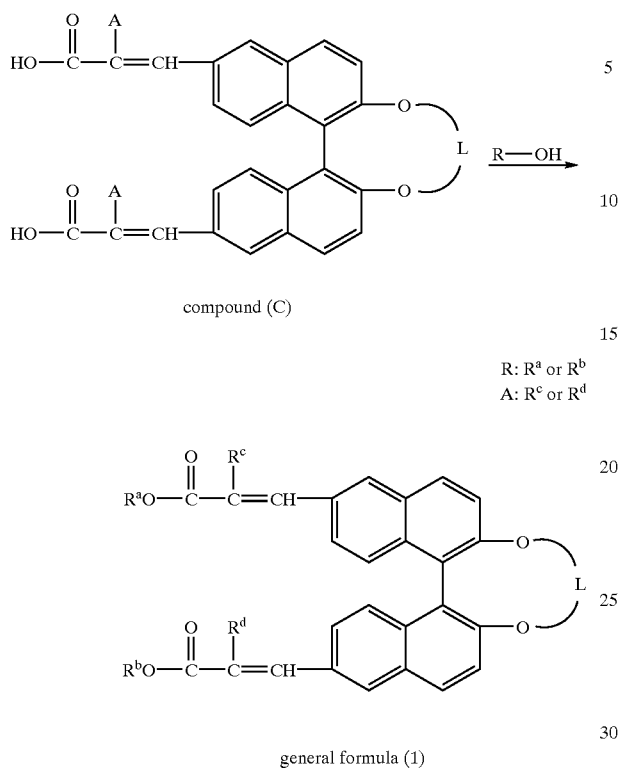

compound (C)

R: $R^a$ or $R^b$
A: $R^c$ or $R^d$ general formula (1)

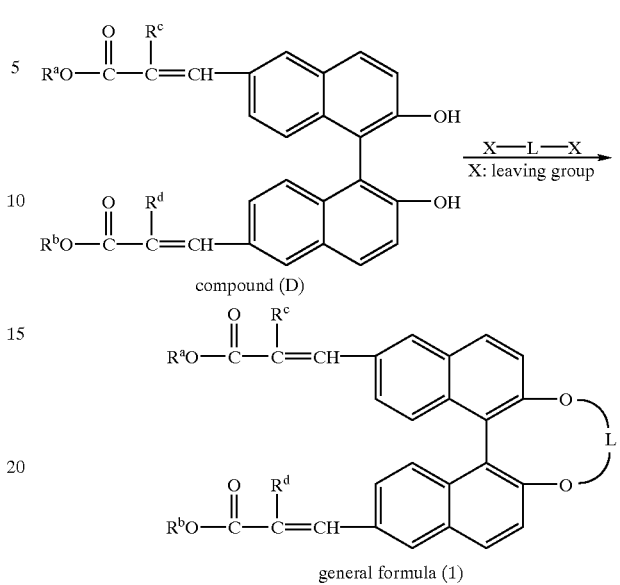

Formula 4 compound (D)

general formula (1)

The reaction of reaction formula (1) is the Heck reaction of an aryl halide (A) and an acrylate. For the details thereof, pages 121 to 129 of the "Experimental Chemistry Lecture 19" fourth edition edited by Nihon Kagaku Kai (Maruzen) can be referred to.

The reaction of reaction formula (2) is the Wittig reaction of an aryl aldehyde (B) and a Wittig reagent. For the details thereof, pages 57 to 78 of the same "Experimental Chemistry Lecture 19" can be referred to. The Wittig reagent is not limited to those represented by the reaction formula (2), and the so-called Wadsworth-Emmons type reagents can be used as well.

The reaction of reaction formula (3) is the esterifying reaction of an alcohol and a carboxylic acid (C) obtained by hydrolysis of an ester obtained by the method according to the reaction formula (1) or (2) or by the Knoevenagel reaction of an aryl aldehyde (B) and a malonic acid, or the like. The reaction may be carried out by a dehydrating agent such as a DCC, or the reaction with an alcohol may be carried out after making the carboxylic acid (C) into an acid halide by an oxalyl chloride, or the like. For the details of the esterification, pages 43 to 83 of "Experimental Chemistry Lecture 22" fourth edition edited by Nihon Kagaku Kai (Maruzen) can be referred to.

Moreover, the optically active compounds represented by the general formula (1) can also be produced by a method of introducing the divalent group L in a subsequent step as represented by the reaction formula (4) shown below. Here, the starting materials represented by the reaction formula (4) can be produced by a method disclosed in the Japanese Patent Application No. 2001-246704.

The molecular weight of the optically active compounds represented by the general formula (1) is preferably 450 or more. Moreover, one having a high compatibility with a liquid crystal compound is preferable, and one having a solubility parameter (SP) value approximately equal to that of the cholesteric liquid crystal compound is further preferable.

Photoreactive Chiral Agent

A photoreactive chiral agent of the present invention includes the compounds represented by the general formula (1) (optically active compound). It is capable of controlling the orientation of a liquid crystal compound, and changing the helical pitch of a liquid crystal due to light irradiation.

The optically active compound represented by the general formula (1) functions as a chiral compound (photoreactive chiral agent) which changes the helical structure of the liquid crystal compound when it is used with the liquid crystal compound, preferably a nematic liquid crystal compound. Thus it changes the helical twisting power (HTP) of the helical structure of the liquid crystal compound due to the reaction of the optically active compound having a photosensitive wavelength in a particular wavelength range when light of that wavelength is irradiated thereon. That is, it is a compound capable of changing the helical twisting power of the helical structure induced in a liquid crystal phase as a result of light irradiation (ultraviolet light—visible light—infrared ray). The optically active compound comprises a chiral site and a site which causes a structural change by light irradiation in the same molecule.

Furthermore, the photoreactive chiral agent represented by the general formula (1) has a large HTP change rate particularly for a liquid crystal molecule. In particular, when the liquid crystal phase is a cholesteric liquid crystal phase, the selective reflection shown by the liquid crystal can be suitably changed in accordance with the HTP so that selective reflection can be obtained in a wide wavelength range which includes the three primary colors which are B (blue), G (green), and R (red). The selective reflection property of the light wavelength is determined by the twist angle of the helical structure of the liquid crystal molecule. The larger the change in the angle, the wider the color range for the selective reflection, and thus this selective reflection property is useful.

The HTP denotes the helical twisting power of the helical structure of the liquid crystal, that is, HTP=1/(pitch×chiral agent concentration [mass percentage]). It can be calculated, for example, by measuring the helical pitch (one cycle of the helical structure; μm) of the liquid crystal molecule at a certain temperature, and converting the value using the pitch and the chiral agent concentration [μm$^{-1}$].

When a selectively reflected color is formed with the photoreactive chiral agent by light irradiation, the change ratio of the HTP (=HTP before the irradiation/HTP after the irradiation) is preferably 1.5 or more, and more preferably 2.5 or more, in the case where the HTP becomes smaller after the irradiation, and it is preferably 0.7 or less, and more preferably 0.4 or less in the case where the HTP becomes larger after the irradiation.

If the photoreactive chiral agent represented by the general formula (1) has a structure in which one or more polymerizable bonding groups are introduced in the same molecule, the thermal resistance of the liquid crystal composition, a liquid crystal color filter, an optical filter or the like, including the optically active compound, can be improved.

Moreover, the photoreactive chiral agent of the present invention can be used with a known chiral agent which is not photoreactive, such as a chiral compound whose twsting power has a large temperature dependency. Examples of the non-photoreactive chiral agent include those disclosed in the official gazette of JP-A No. 2000-44451, the Japanese Patent Application Domestic Publication (Laid-Open) No. 10-509726, the WO98/00428, the official gazette of the Japanese Patent Application Domestic Publication (Laid-Open) Nos. 2000-506873, 9-506088, page 327 of the "Liquid Crystals" 1996, 21, and page 219, 1998, 24 of the same, or the like.

Liquid Crystal Composition

A liquid crystal composition of the present invention contains at least the optically active compound of the present invention, that is, a photoreactive chiral agent, and further, at least one kind of a liquid crystal compound, preferably a nematic liquid crystal compound, and as needed other components such as a polymerizable monomer, a polymerization initiator, a binder resin, a solvent, a surfactant, a polymerization inhibitor, a thickener, a coloring agent, a pigment, an ultraviolet light absorbing agent, and a gelling agent.

It is particularly preferable that a liquid crystal composition of the present invention includes a surfactant. For example, in the case of coating a liquid crystal composition in a coating liquid form for forming a layer, the orientation of the layer surface at the air interface can be controlled three-dimensionally. Particularly in the case of a cholesteric liquid crystal phase, a selective reflection wavelength with a higher color purity can be obtained.

Since the liquid crystal composition of the present invention contains the above-mentioned optically active compound, the HTP of the liquid crystal can be changed significantly according to the intended use of the liquid crystal composition thus it can be adopted for a wider range of applications. It can be used, for example, as a liquid crystal color filter, or an optical film including a circular-polarization separation film, three-dimensional vision glasses, and a polarizing mask, and optically writable recording media, or the like.

Photoreactive Chiral Agent

A liquid crystal composition of the present invention contains the photoreactive chiral agent, that is, the optically active compound represented by the general formula (1) so that the twist structure of the liquid crystal compound which is also included in the crystal composition (preferably nematic liquid crystal compound) is changed by irradiating light in a desired pattern and light amount so as to form a color having selective reflection in a wide wavelength region.

The content of the photoreactive chiral agent in the liquid crystal composition is not particularly limited and it can be suitably selected, but it is preferably about 0.1 to 30% by weight.

Liquid Crystal Compound

The liquid crystal compound can be suitably selected from a low molecular liquid crystal compound whose refractive index anisotropy Δn is 0.10–0.40, a polymer liquid crystal compound, and a polymerizable liquid crystal compound. In particular, a nematic liquid crystal compound is preferable. These liquid crystal compounds can be oriented by for example, using a substrate with which has been subjected to an orientation process such as rubbing while in the molten liquid crystal state, or the like. Moreover, the liquid crystal state may be fixed by cooling or polymerization into a solid phase.

Specific examples of the liquid crystal compounds include the following compounds. However, the present invention is not limited to these examples.

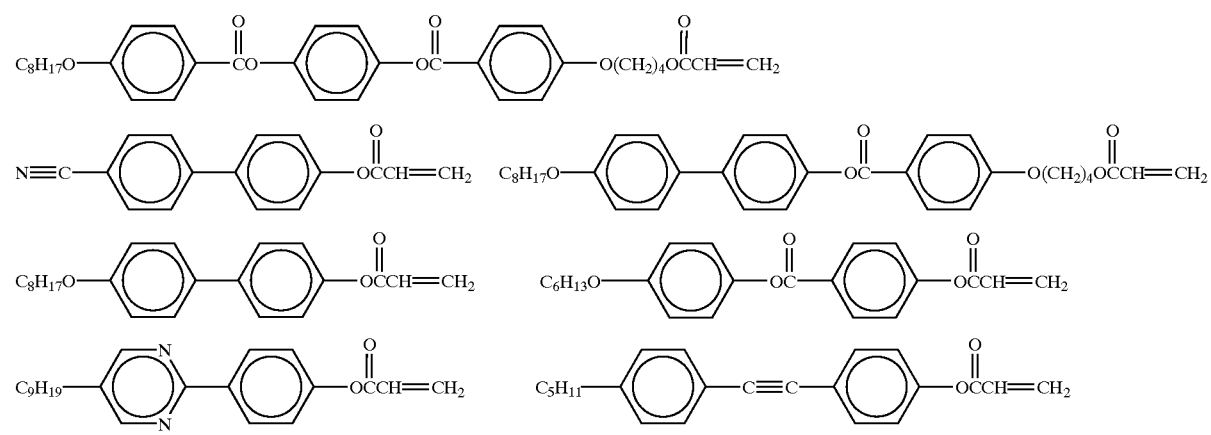

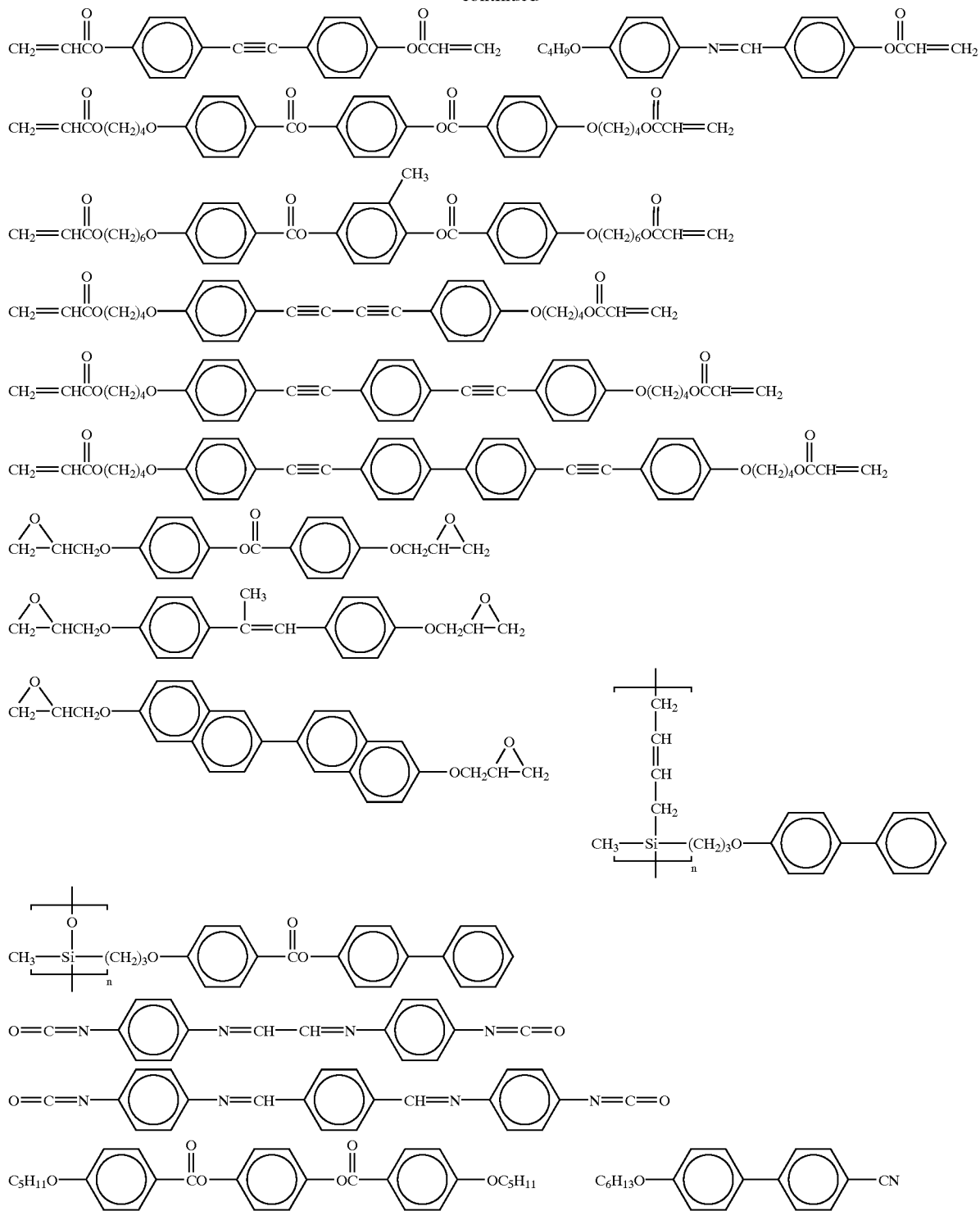
In the above formulae, n denotes an integer from 1 to 1,000.
Compounds which are the same as the above examples except that the linking group between aromatic rings have the structures below are also preferable examples.
—CH₂CH₂—
—OCH₂—
—CH=CH—

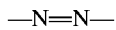

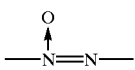

Among the above-mentioned liquid crystal compounds, from the viewpoint of ensuring a sufficient hardening ability and improving the thermal resistance of the layer, a liquid crystal compound having a polymerizable group or a cross-linking group in the molecule is preferable.

The content of the liquid crystal compound is preferably 30 to 99.9% by weight, and further preferably 50 to 95% by weight with respect to the weight of the solid components of the liquid crystal composition. In the case the content is less than 30% by weight, the orientation may be insufficient so that a desired selectively reflected color may not be obtained.

Polymerizable Monomer

For the liquid crystal composition of the present invention, a polymerizable monomer may be included as well. When the polymerizable monomer is included, after forming the selective reflection wavelength distribution by changing the liquid crystal twisting power due to light irradiation (patterning), the helical structure (selective reflection property) can be fixed so that the strength of the liquid crystal composition after the fixation can further be improved. When the cholesteric liquid crystal compound has an unsaturated bond in the same molecule, the polymerizable monomer is not necessarily added.

The polymerizable monomer may be a monomer having an ethylenically unsaturated bond. Specifically, polyfunctional monomers such as a pentaerythritol tetraacrylate, and a dipentaerythritol hexaacrylate may be used.

Specific examples of the monomer having an ethylenically unsaturated bond are the following compounds. However, the present invention is not limited to these examples.

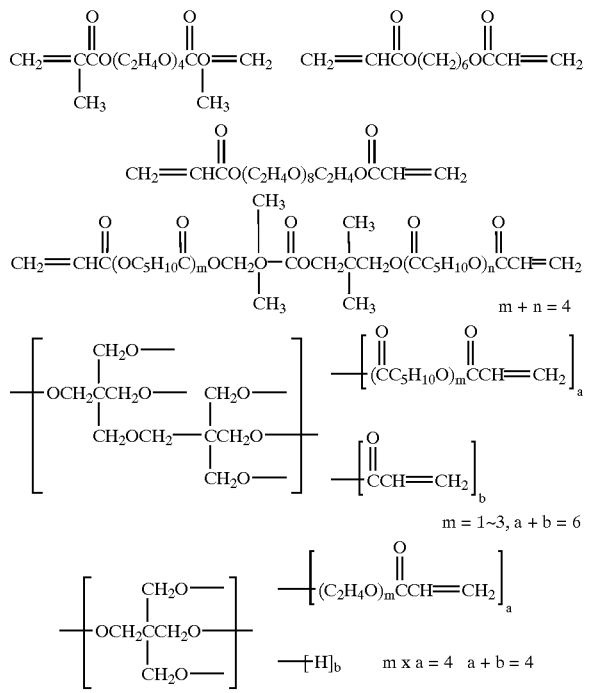

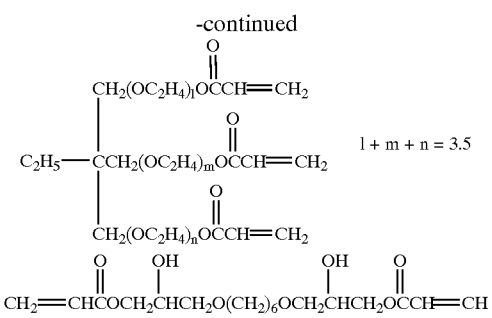

The addition amount of the polymerizable monomer is preferably 0.5 to 50% by weight with respect to the weight of solid components of the liquid crystal composition. If the addition amount is less than 0.5% by weight, a sufficient hardening property may not be obtained. In contrast, if it is more than 50% by weight, the orientation of the liquid crystal molecule is hindered so that a sufficient color development may not be obtained.

Photo Polymerization Initiator

If a polymerization reaction of a polymerizable liquid crystal compound is utilized in order to fix the helical structure after the helical twisting power of the liquid crystal is changed by light irradiation, to improve the strength of the liquid crystal composition after the fixation, it is preferable to add a photo polymerization initiator. Moreover, it is preferable that the photosensitive wavelength region of the photo polymerization initiator is different from the photosensitive wavelength region of the optically active compound represented by the general formula (1).

The photo polymerization initiator can be suitably selected from known products. Examples thereof include a p-methoxyphenyl-2,4-bis(trichloromethyl)-s-triazine, a 2-(p-butoxystyryl)-5-trichloromethyl1,3,4-oxadiazol, a 9-phenylacrydine, a 9,10-dimethylbenzphenazine, a benzophenone/Michler's ketone, a hexaarylbiimidazol/mercaptobenzimidazol, a benzyl dimethyl ketal, a thioxanthone/amine, a triarylsulfonium hexafluorophosphate, or the like. Other examples include bisacyl phosphine oxides such as a bis-(2,4,6-trimethylbenzoyl)phenylphosphine oxide disclosed in the JP-A No. 10-29997, acylphosphine oxides such as a Lucirin TPO disclosed in DE4230555, or the like.

As the photo polymerization initiator, it is preferable to select one having a photosensitive wavelength region different from the photosensitive wavelength region of the optically active compound represented by the general formula (1). Here, "having a different photosensitive wavelength" means the photosensitive central wavelengths of the photo polymerization initiator and that of the optical active compound not to overlap. That is to say, because both substances are sensitive to different wavelengths, for example, the orientation of the liquid crystal is not changed, at the time of image exposure and hardening due to polymerization, to the extent that image display property and color purity due to selective reflection deteriorate. Overlap of the photosensitive central wavelengths can be prevented by the molecular structures of the photo polymerization initiator and the optionally active compound, and also by controlling the wavelength of the light directed through a band pass filter, or the like.

The addition amount of the photo polymerization initiator is preferably 0.1 to 20% by weight, more preferably 0.5 to 5% by weight with respect to the weight of solid components of the liquid crystal composition. If the addition amount is less than 0.1% by weight, a long time may be required for hardening at the time of light irradiation since hardening effiecency is low. In contrast, in the case where the amount of the polymerization initiator is more than 20% by weight, the light transmittance from the ultraviolet light range to the visible light range may be poor.

Other Components

Furthermore, other components such as a binder resin, a solvent, a surfactant, a polymerization inhibitor, a thickener, a coloring agent, a pigment, an ultraviolet light absorbing agent, a gelling agent, or the like may be added.

As the binder resin, for example, polystyrene compounds such as a polystyrene, and a poly-α-methylstyrene, cellulose resins such as a methyl cellulose, an ethyl cellulose, and an acetyl cellulose, acidic cellulose derivatives having a carboxyl group in a side chain, acetal resins, such as a polyvinyl formal, and a polyvinyl butyral, methacrylic acid copolymers, acrylic acid copolymers, itaconic acid copolymers, crotonic acid copolymers, maleic acid copolymers, partially esterified maleic acid copolymers disclosed in the JP-A No. 59-44615, Japanese Patent Application Publication (JP-B) Nos. 54-34327, 58-12577, 54-25957, the JP-A Nos. 59-53836, and 59-71048, or the like, can be used.

Homopolymers of an alkyl acrylate, and homopolymers of an alkyl methacrylate can be used as well. Examples include those having as the alkyl group a methyl group, an ethyl group, an n-propyl group, an n-butyl group, an isobutyl group, an n-hexyl group, a cyclohexyl group, a 2-ethylhexyl group, and the like.

In addition thereto, homopolymers/polymers having an acid anhydride added to a polymer having a hydroxyl group, a benzyl (meth)acrylate/a (homopolymer of a methacrylic acid)/an acrylic acid copolymer, a polyfunctional copolymer of a benzyl (meth)acrylate/a (meth)acrylic acid/another monomer, or the like, can be used.

The content of the binder resin in the liquid crystal composition is preferably 0 to 50% by weight, and more preferably 0 to 30% by weight. Where the content is more than 50% by weight, the orientation of the liquid crystal compound may be insufficient.

In a liquid crystal composition of the present invention, it is preferable to use a surfactant together with a photoreactive chiral agent and a liquid crystal compound. As the surfactant, a surfactant having the excluded volume effect is preferable. Here, to "have the excluded volume effect" denotes three-dimensional control of the spatial orientation state of the layer surface at the air interface at the time of, for example, forming a layer including the liquid crystal composition by coating. Specifically, a nonionic surfactant is preferable, and thus it can be selected optionally from known nonionic surfactants.

The polymerization inhibitor is added in order to improve the storage property. For example, examples thereof can include a hydroquinone, a hydroquinone monomethyl ether, a phenothiazine, a benzoquinone, derivatives thereof, or the like. The addition amount of the polymerization inhibitor is preferably 0 to 10% by weight, and more preferably 0 to 5% by weight with respect to the polymerizable monomer.

The liquid crystal composition of the present invention can be prepared by dissolving or dispersing the above-mentioned components in an adequate solvent. It can be formed in a suitable shape, or formed on a supporting member, or the like. As the solvent, for example, a 2-butanone, a cyclohexanone, a methylene chloride, a chloroform, or the like, can be used.

Method for Changing the Helical Structure of a Liquid Crystal

As mentioned above, the liquid crystal composition of the present invention contains an optically active compound (photoreactive chiral agent). In a method for changing the helical structure of a liquid crystal of the present invention, by changing the helical twisting power of the liquid crystal by irradiating light of different amounts on the liquid crystal composition of the present invention, a region of the liquid crystal with a different twist structure, that is, a region with a different degree of helical twisting (helical twisting power; HTP) can be formed.

Moreover, particularly in the case where the liquid crystal phase is a cholesteric liquid crystal phase, the selectively reflected color of the liquid crystal can be suitably changed according to the helical twisting power thereof. In the case where the change ratio of the helical twisting power (twist change rate) is large, the color width of the selectively reflected color to be obtained by selective reflection of the liquid crystal is wide so that the selective reflection can be obtained in a wide wavelength region which includes the three primary colors (B, G, R). This is important particularly in terms of displaying the three primary colors BGR with a high color purity. In this regard, since the optically active compound represented by the general formula (1) can cause the helical twisting power of the liquid crystal helical structure to change significantly, by using a liquid crystal composition including the compound (chiral agent), a wide hue including the three primary colors of blue (B), green (G), and red (R) can be displayed, and furthermore, the three primary colors can be obtained with excellent color purity.

Specifically, it can be carried out as follows. When light of a certain wavelength is irradiated into a liquid crystal composition, a photoreactive chiral agent (optically active compound represented by the general formula (1)) also present in the compound is exposed so that the helical structure (twist angle) of the liquid crystal is changed in accordance with the intensity of the irradiation. In accordance with the structural change, a different selectively reflected color is provided so as to form an image-wise pattern (patterning). Therefore, by light irradiation of differing irradiation intensity for each desired region, a plurality of colors can be provided corresponding to the irradiation intensities. For example, by exposure via an exposing mask having image-wise different light transmission regions, an image, that is, colored region with different selective reflections can be formed simultaneously by irradiating light once. Furthermore, since the compound represented by the general formula (1) is used, the formed colored region shows a wide selectively reflected color so that the three primary colors BGR can be formed with excellent color purity. The light irradiation can be carried out not only by the method using the exposing mask, but any method as long as the irradiation intensity can be changed for the desired regions.

In the case of forming the liquid crystal color filter, optical filter, or the like which is described later, after image-wise patterning with light of a certain wavelength as mentioned above, light is further irradiated for photo polymerizing a polymerizable group in the liquid crystal composition so as to harden a layer including the composition and to fix the helical structure of the liquid crystal at a desired selectively reflected color. Details of the method will be described later.

As the light source used for the light irradiation, a light source which emits ultraviolet light is preferable for its high energy, and capability of quickly executing structural change of the liquid crystal compound and the polymerization reaction. Examples thereof include a high pressure mercury lamp, a metal halide lamp, an Hg-Xe lamp, or the like. Moreover, it is preferable that the light source has a function such that light amount is variable.

In the case where a liquid crystal composition including a chiral agent represented by the general formula (1) is used, since the helical twisting power change ratio of the helical structure of the liquid crystal is large with respect to the light amount as mentioned above, for example, in the case of a cholesteric liquid crystal phase, the color width of the selectively reflected color to be obtained by the liquid crystal can be widened so that the three primary colors, blue (B), green (G), and red (R) can be obtained with excellent color purity.

As described above, a liquid crystal color filter, and optical films such as a circular-polarization separation film three-dimensional vision glasses, and a polarizing mask, or the like can be formed, by using the optically active compound represented by the general formula (1) and by utilizing a large helical pitch change ratio induced by the liquid crystal phase due to light irradiation. Moreover, the optically active compound represented by the formula (1) can be applied to a wide band switchable mirror, an optically writable recording medium, or the like. Patterning in a polarized state, and patterning of a helical pitch can be enabled by doping it with a ferroelectric liquid crystal, an antiferroelectric liquid crystal, or a TGB phase. Furthermore, use of the optically active compound of the present invention as an ordinary optically active compound is possible, and application to a helical structure inducing agent in an STN element or a TN element is also possible.

Moreover, a non-chiral azo or styrene compound, which is anisotropic with respect to light can be included in the liquid crystal composition of the present invention, and thus can further increase the helical pitch change ratio at the time of the light irradiation.

Method for Fixing the Helical Structure of a Liquid Crystal

Moreover, a method for fixing a helical structure of a liquid crystal of the present invention comprises the steps of image-wise irradiating light in a photosensitive wavelength region of the optically active compound represented by the general formula (1) and executing the photo polymerization by irradiating light in the photosensitive wavelength region of the photo polymerization initiator. It is preferable to use a liquid crystal composition having the optically active compound and the photo polymerization initiator whose photosensitive wavelength regions differ.

When the photosensitive wavelength region of the optically active compound and the photosensitive wavelength region of the photo polymerization initiator are different, the light irradiation for changing the HTP and the light irradiation for photo polymerization do not affect each other. Therefore, since the photo polymerization does not proceed at the time of the image-wise exposure for changing the HTP, patterning is enabled at a predetermined THP change rate. In contrast, the optically active compound is not affected by light at the time of photo polymerization for fixing the helical structure so that fixing of the HTP change pattern which was formed can be ensured.

Hereinafter, a liquid crystal color filter, an optical film, and a recording medium will be described in detail.

Liquid Crystal Color Filter

A liquid crystal color filter of the present invention includes at least the optically active compound of the present invention, and further, a nematic liquid crystal compound, as needed, a polymerizable monomer, a photo polymerization initiator, the other components mentioned above in the description for the liquid crystal composition of the present invention, such as a surfactant having the excluded volume effect, or the like. It can be produced by the light irradiation with a desired pattern and a light amount suitably selected based on the above "method for changing the helical structure of a liquid crystal".

Hereinafter, by explaining the production method, a liquid crystal color filter of the present invention will be described in detail.

A liquid crystal color filter of the present invention can be produced by suitably selecting a liquid crystal composition of the present invention, or a known composition which includes an optically active compound represented by the general formula (1) and forming the filter therefrom.

In this case, the liquid crystal color filter may be in a sheet-like form comprising only the liquid crystal composition, or may be a layer form including the liquid crystal composition (liquid crystal layer) on a desired supporting member or temporary supporting member, and furthermore, other layers (films) such as an orientation film and a protection film can be provided. In the latter case, two or more liquid crystal layers may be laminated. In this case, the exposure step later described is carried out a plurality of times.

The nematic liquid crystal compound, a polymerizable monomer, a photo polymerization initiator and other components may be those usable for the liquid crystal composition of the present invention. The content, the preferable range, or the like, thereof are also the same as the case of the liquid crystal composition. In this case, it is preferable to use a surfactant having the excluded volume effect.

Moreover, the content of the optically active compound represented by the general formula (1) in the liquid crystal composition comprising the liquid crystal color filter is same as that of the liquid crystal composition of the present invention.

The liquid crystal color filter of the present invention can be produced preferably using, for example, the liquid crystal composition of the present invention.

Moreover, the method for producing the liquid crystal color filter is not particularly limited. For example, a production method comprising at least a step of patterning by image-wise exposure with a first light followed by a step of hardening by photo polymerization with a second light (hereinafter referred to as an "exposure step") can be adopted. Furthermore, according to the selected production form, a step of applying an orientation process on a contact surface with respect to the liquid crystal composition (orientation process step), a step of transferring a liquid crystal layer by close contact and peeling (transfer step), a step of forming a liquid crystal layer by coating a cholesteric liquid crystal composition (coating step), or the like, can optionally be included as well.

Hereinafter, as an example of a production method including the above-mentioned exposure step, a specific embodiment will be described.

Exposure Step

In the exposure step, either patterning of a liquid crystal compound or fixation (polymerization hardening) is carried out by light irradiation. That is, after patterning by image-wise exposure with a first light of a wavelength to which the optically active compound (hereinafter referred to as a "photoreactive chiral agent") is highly sensitive, photo polymerization is carried out by a second light to which the polymerzation initiator is highly sensitive for hardening so that the helical structure of the liquid crystal compound is fixed at a desired selectively reflected color.

In the case where the first light is irradiated to the liquid crystal composition, the photoreactive chiral agent is exposed in accordance with the irradiation degree thereof so as to change the helical structure of the liquid crystal compound. According to the structural change, a different selectively reflected color is provided so as to form an image-wise pattern. Therefore, by irradiation with light of different irradiation intensities for each desired region, a plurality of colors can be provided corresponding to the irradiation intensities. For example, by image-wise exposure via a mask with image-wise different light transmittance regions and by carrying out light irradiation once, a colored region with different selective reflections can be formed simultaneously. Furthermore, by hardening (fixing) the same by irradiating the second light, a liquid crystal color filter can be produced.

The wavelength of the first light is preferably set in a photosensitive wavelength region of the photoreactive chiral agent, in particular, at a wavelength in the vicinity of the photo sensitivity peak wavelength in order to obtain a sufficient patterning sensitivity. Moreover, the wavelength of the second light is preferably set in a photosensitive wavelength region of the polymerization initiator, in particular, at a wavelength in the vicinity of the photosensitivity peak wavelength in order to obtain a sufficient photo polymerization sensitivity.

Furthermore, the irradiation degree (irradiation intensity) of the first and second lights is not particularly limited, and thus it can be suitably selected according to the material to be used so as to obtain a sufficient light sensitivity at the time of patterning and polymerization hardening. As the light source used for the first and second light irradiation, the same light source usable for the light irradiation for the above-mentioned liquid crystal composition can be used as well.

More specifically, the production methods of first and second embodiments described below can be used as well. The production methods of these two embodiments are more preferable.

First Embodiment (1) Step for providing a liquid crystal composition in a coating liquid form on a temporary supporting member to form a transfer material having at least a liquid crystal layer.

The liquid crystal composition in a coating liquid form can be prepared by dissolving and dispersing the components in an appropriate solvent. Here, as the solvent, for example, a 2-butanone, a cyclohexanone, a methylene chloride, a chloroform, or the like, can be used.

A cushion layer including a thermoplastic resin, or the like, can be provided between the liquid crystal layer and the temporary supporting member from the viewpoint of ensuring close contact property at the time of transfer, for example, in a case where a foreign substance is present on a member to be transferred, or the like. It is also preferable for the surface of the cushion layer to be subjected to an orientation process such as a rubbing process (orientation process step) or the like.

(2) Step of laminating the transfer material on a light transmissible substrate.

In addition to the light transmissible substrate, an image receiving material having an image receiving layer on the base material can be used as well. Moreover, the liquid crystal composition can be coated and formed directly on the substrate (coating step) without using the transfer material. The coating operation can be suitably selected from known coating methods using a bar coater, a spin coater, or the like. However, in view of the material loss and the cost, a method involving transfer is preferable.

(3) Step of forming a cholesteric liquid crystal layer on the substrate by peeling off the transfer material from the light transmissible substrate (transfer step).

The liquid crystal layer may be formed in a plurality of layers by further laminating after carrying out the step (4) below.

(4) Step of forming a pixel pattern showing a selectively reflected color by image-wise irradiation of ultraviolet light of an irradiation strength v1 on the cholesteric liquid crystal layer via a mask, and hardening the layer by further irradiating ultraviolet light of an irradiation strength v2 thereto (exposure step).

Second Embodiment (1) Step of forming a liquid crystal layer by providing a liquid crystal composition directly on a supporting member comprising a color filter.

Here, the liquid crystal layer can be formed by coating the liquid crystal composition prepared in a coating liquid form as mentioned above by a known application method using a bar coater, a spin coater, or the like.

Moreover, the orientation film may be formed between the cholesteric liquid crystal layer and the temporary supporting member. It is also preferable to subjcet the surface of the orientation film to orientation process (orientation process step) such as a rubbing process, or the like.

(2) Exposure step which is the same as the step (4) of the first embodiment.

The thickness of the liquid crystal layer (sheet-like liquid crystal composition) to serve as the liquid crystal color filter is preferably 1.5 to 4 $\mu$m.

Explanation will be given with reference to FIGS. 1A to 1I. FIGS. 1A to 1I are cross-sectional views showing an embodiment of production steps of a liquid crystal color filter of the present invention.

First, the components are dissolved in an appropriate solvent for preparing a coating liquid-like cholesteric liquid crystal composition. The components and the solvent are as mentioned above.

Figure 1B:
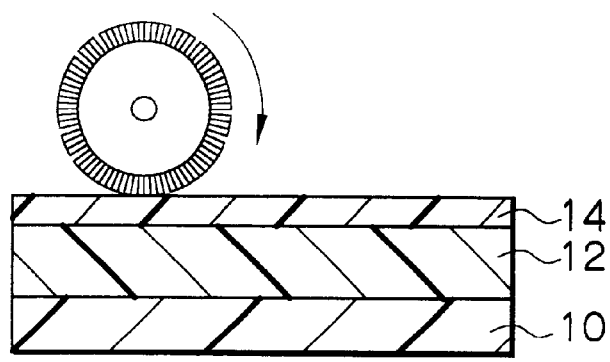

As shown in FIG. 1A, a supporting member 10 (hereinafter referred to as a "temporary supporting member") is prepared. By coating on the supporting member 10, for example, an acrylic resin, a polyester, a polyurethane, or the like, a cushion layer (thermoplastic resin layer) 12 is provided. And furthermore, an orientation film 14 made of a polyvinyl alcohol, or the like, is laminated thereon. The orientation film, as shown in FIG. 1B is subjected to a rubbing process. The rubbing process is not necessarily required, but the orientation property can further be improved by carrying out the rubbing process.

Figure 1C:
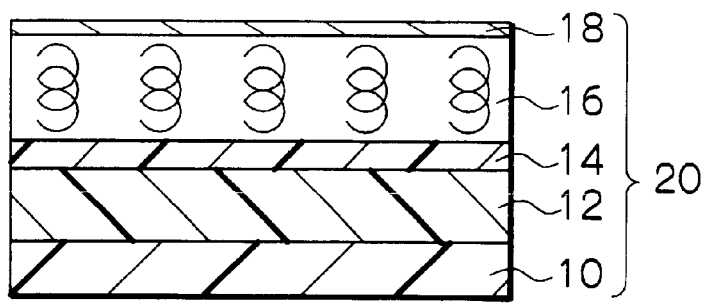

Next, as shown in FIG. 1C, after coating a coating liquid-like cholesteric liquid crystal composition on the orientation film 14 and drying for forming a cholesteric liquid crystal layer 16, a cover film 18 is provided on the cholesteric liquid crystal layer 16 for producing a transfer material. Hereinafter, the transfer material is referred to as a transfer sheet 20.

Figure 1D:
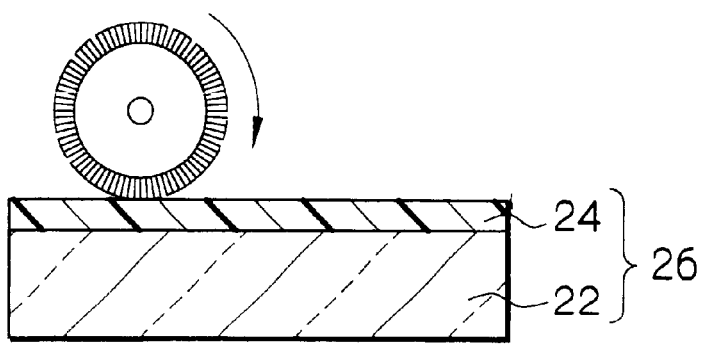

In contrast, as shown in FIG. 1D, another supporting member 22 is prepared. In the same manner as mentioned above, an orientation film 24 is formed on the supporting member, and further the surface thereof is subjected to a rubbing process. Hereinafter, this will be referred to as a substrate for a color filter 26.

Figure 1E:
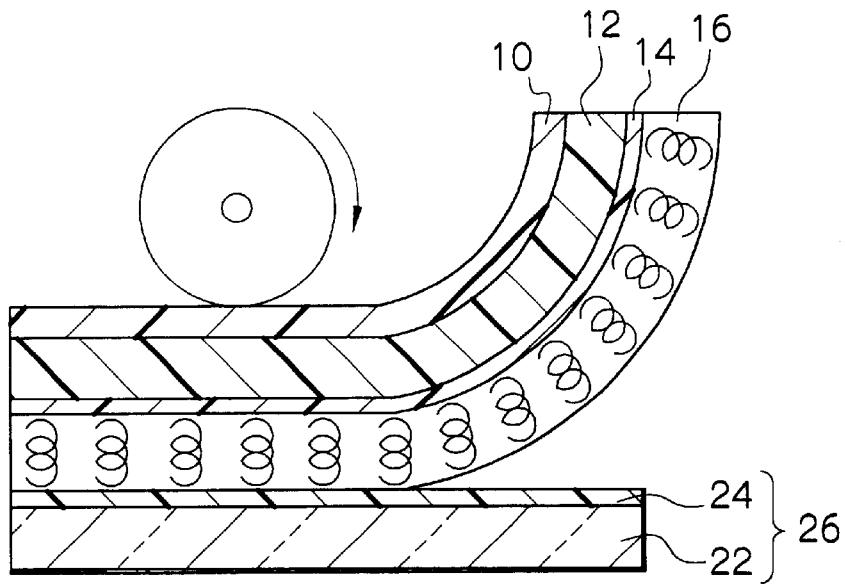

Next, after peeling off the cover film 18 of the transfer sheet 20, as shown in FIG. 1E, the surface of the cholesteric liquid crystal layer 16 of the transfer sheet 20 and the surface of the orientation film 24 of the substrate for a color filter 26 are brought in contact with each other and superimposed.

Figure 1F:
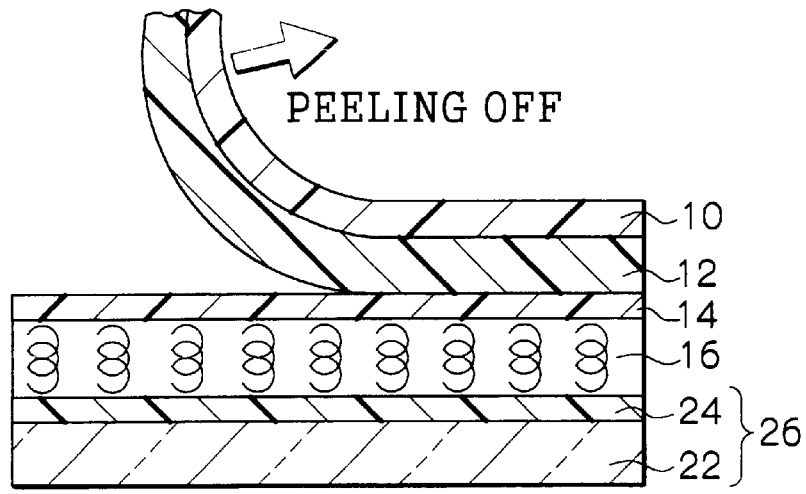

Using a roll rotating in the arrow direction in the figure, they are laminated. Thereafter, as shown in FIG. 1F, peeling between the orientation film 14 and the cushion layer 12 of the transfer sheet is carried out so that the cholesteric liquid crystal layer is transferred onto the substrate for a color filter together with the orientation film 14. In this case, the cushion layer 12 is not necessarily peeled off together with the temporary supporting member 10.

Figure 1G:
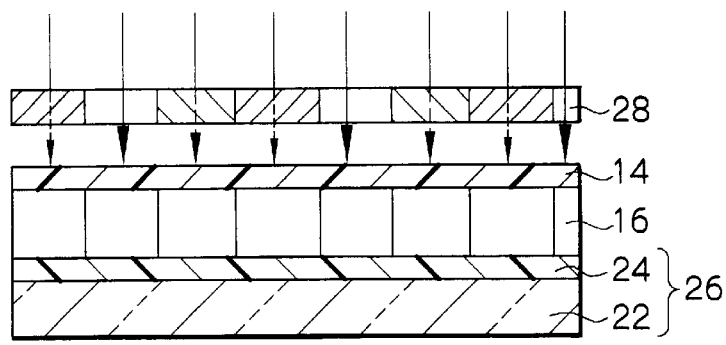

After the transfer, as shown in FIG. 1G, a mask 28 having a plurality of regions with different light transmissivities is disposed above the orientation film 14. Through the mask 28, a first light is irradiated to the cholesteric liquid crystal layer 16 in a pattern. A liquid crystal compound, a chiral compound, or the like, are included in the cholesteric liquid crystal layer 16 so as to have different helical pitches according to the light irradiation amount. Regions having different helical pitches are formed in the cholesteric liquid crystal layer by irradiation. For example, a region reflecting green (G) and transmitting blue (B) and red (R), a region reflecting blue (B) and transmitting green (G) and red (R), and a region reflecting red (R) and transmitting green (G) and blue (B) are formed.

Figure 1H:
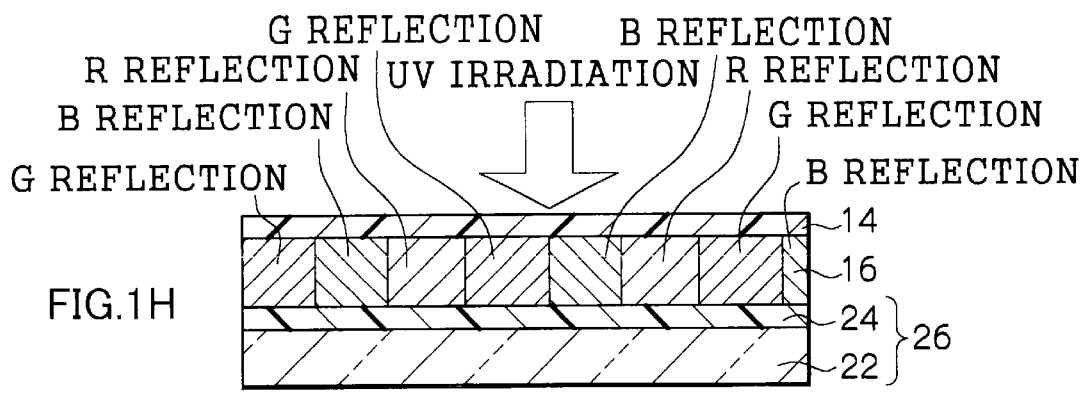
Figure 1I:
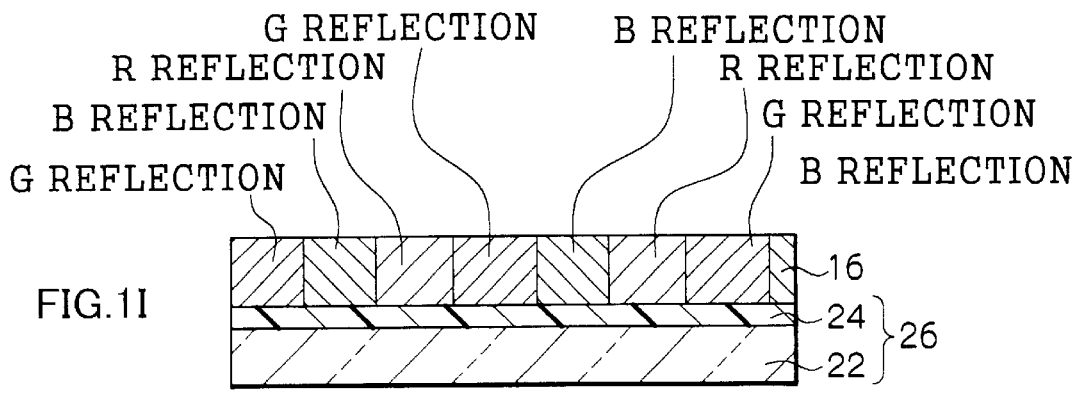

Next, as shown in FIG. 1H, the pattern is fixed by further irradiating ultraviolet light onto the cholesteric liquid crystal layer 16 with an irradiation intensity different from that of the light irradiation in the above-mentioned step (G). Thereafter, by removing the unnecessary portions (for example, the residual portions of the cushion layer, the intermediate layer, or the like, the unexposed portions) on the cholesteric liquid crystal layer 16 using a 2-butanone, a chloroform, or the like, a cholesteric liquid crystal layer having the BGR reflection regions can be formed as shown in FIG. 1I.

Although the method shown in the FIG. 1 is an embodiment of a production method for a color filter in which the laminate method is used, a production method using a coating method in which the liquid crystal layer is coated and formed directly on a substrate for a color filter may be used as well. In this case, according to the above-mentioned embodiment, after coating the cholesteric liquid crystal layer on the orientation film 24 of the substrate for a color filter 26 shown in FIG. 1D and drying the layer, the same steps shown in FIGS. 1G to 1I are executed successively.

The steps and the materials to be used, such as the transfer material, and the supporting member material are described in detail in the Japanese Patent Application Nos. 11-342896 and 11-343665 which were proposed by the present inventors.

As mentioned above, by using the liquid crystal composition including the optically active compound represented by the general formula (1), since the helical twisting power change ratio of the liquid crystal helical structure is large with respect to the light amount, the color width of the selectively reflected color to be obtained by the liquid crystal can be widened so that a liquid crystal color filter having the three primary colors, blue (B), green (G), and red (R) with excellent color purity can be obtained.

Optical Film

An optical film of the present invention includes the optically active compound of the present invention, and furthermore, a liquid crystal compound, and as needed, other components described for the liquid crystal composition of the present invention such as a polymerizable monomer, a photo polymerization initiator, and a surfactant having the excluded volume effect, or the like. It can be suitably produced by light irradiation with a desired pattern and a light amount selected based on the above "method for changing the helical structure of a liquid crystal".

The optical film of the present invention can be produced by suitably selecting the liquid crystal composition of the present invention, or a known composition including the optically active compound represented by the general formula (1). Here, the form of the optical film is not particularly limited, and it can either be a sheet form comprising only the above-mentioned liquid crystal composition, or a form having the layer including the liquid crystal composition (liquid crystal layer) on a desired supporting member or a temporary supporting member. Furthermore, other layers (films) such as an orientation film, and a protection film can be provided as well.

The liquid crystal compound, polymerizable monomer, photo polymerization initiator and other components may be those usable for the liquid crystal compositions. The content, preferable range, or the like, thereof are the same as in the case of the liquid crystal composition. Moreover, the content of the optically active compound represented by the general formula (1) in the liquid crystal composition comprising the optical film is also the same as that of the liquid crystal composition of the present invention.

The optical film of the present invention can be produced preferably, for example, by using the liquid crystal composition of the present invention.

Moreover, as to the method for producing the optical film, the substantially same production method as that of the liquid crystal color filter can be adopted. It can be a method in which the exposure step is carried out at least once. Furthermore, a production method including the orientation process step, transfer step, application step, or the like, can be adopted according to the selected production embodiment.

More specifically, the substantially same production method as the above-mentioned first and second embodiments can be employed as well.

As heretofore described, by using the liquid crystal composition including the optically active compound represented by the general formula (1), the helical twisting power change ratio of the liquid crystal helical structure can be enlarged with respect to the light amount. Particularly in the case where the liquid crystal phase is a cholesteric liquid crystal phase, an optical filter having various selectively reflected colors in a wide color range of the liquid crystal selective reflection, an optical filter having the primary colors (B, G, R) with excellent color purity, and the like, can be obtained.

Recording Medium

A recording medium of the present invention includes the optically active compound of the present invention, and furthermore, a liquid crystal compound and as needed other components described for the liquid crystal composition of the present invention, such as a polymerizable monomer, a photo polymerization initiator, and a surfactant having the excluded volume effect, or the like.

The form of the recording medium of the present invention is not particularly limited, and thus it may either be in a sheet-like form comprising only the liquid crystal composition, or in a form provided with layers which include the liquid crystal composition including a photoreactive chiral agent (liquid crystal layer) formed on a desired supporting member or temporary supporting member (hereinafter referred to as a "supporting member, or the like"). Here, the liquid crystal composition can be suitably selected from the liquid crystal composition of the present invention, or a known composition including the compound represented by the general formula (1). Furthermore, other layers (films) such as an orientation film, and a protection film can be provided as well.

The liquid crystal compound, polymerizable monomer, photo polymerization initiator, and other components may be the same as those usable for the above-mentioned liquid crystal composition. The content, preferable range, or the like, thereof are same as those of the case of the liquid crystal composition. Moreover, the content of the optically active compound represented by the general formula (1) is same as that of the liquid crystal composition of the present invention.

The recording medium of the present invention is preferably produced by providing the liquid crystal composition of the present invention on a supporting member, or the like.

Examples of the method for providing the liquid crystal composition on a supporting member, or the like include (1) a method of transferring a liquid crystal layer including the liquid crystal composition of the present invention on a supporting member by using a transfer material having the liquid crystal layer on a temporary supporting member, and (2) a method of directly coating the liquid crystal composition prepared as a coating liquid on a supporting member, or the like.

In the above-mentioned methods (1) and (2), the transfer material, the coating method, or the like, can be provided according to the description of the embodiments (first and second embodiments) of the liquid crystal composition of the present invention and the explanation with reference to FIG. 1.

In the recording medium of the present invention produced as mentioned above, an image (in the case of a cholesteric liquid crystal, a colored image) including the selectively reflected colors determined by the helical pitch change ratio can be formed according to the helical twisting power change ratio of the liquid crystal by light irradiation with a suitably selected desired pattern and light amount. The image can also be formed, for example, based on the above-mentioned "method for changing the helical structure of a liquid crystal" and the "method for fixing the helical structure of a liquid crystal".

Furthermore, by using the optically active compound represented by the general formula (1) as a chiral agent for changing the liquid crystal structure, since the helical twisting power change ratio of the liquid crystal helical structure is large, an image can be formed with a wide color reproduction range. Particularly in the case of a cholesteric liquid crystal, the hue width of the selective reflection of the liquid crystal can be widened so that a colorful multi-colored image can be formed with a high color purity. Moreover, the large helical twisting power change ratio contributes also to achievement of high sensitivity (high speed) at the time of the image formation.

Furthermore, by using a polymerizable liquid crystal compound or a polymerizable monomer, for example, the liquid crystal after patterning can be fixed so that an image can be formed with a sufficient image stability.

By using the same light source usable for the liquid crystal composition of the present invention as the light source for the light irradiation, optical recording can be carried out favorably. Moreover, the same applies to the case of the light irradiation for fixing the liquid crystal.

As heretofore explained, since the liquid crystal helical twisting power (twist angle) can be changed significantly by using the optically active compound represented by the general formula (1) as the chiral agent for changing the helical structure of the liquid crystal molecule, the selective reflection wavelength range obtained by the light irradiation can be widened. As a result, the color purity of the three primary colors BGR can further be improved. Therefore, the hue selectivity and the sharpness of the liquid crystal can be improved. Particularly in a liquid crystal color filter, an optical film, or the like, a clear and sharp color image can be displayed. In the recording medium, an image to be formed can have various hues.

EXAMPLES

Hereinafter, the present invention will be described with reference to examples, but the present invention is not limited to these examples. "Part" and "%" in the embodiments denote the "part by weight and "% by weight" unless otherwise specified.

Example 1

Synthesis of an Optically Active Compound 1-2

After mixing 2.0 g (4.4 mmol) of an (S)-2,2'-methylenedioxy-6,6'-dibromo-1,1'-binaphtol, 62 mg (0.088 mmol) of a dichlorobis(triphenylphosphine)palladium(II), 2.4 ml (17.6 mmol) of a triethylamine, and 20 ml of a DMF, 1.0 ml (9.7 mmol) of an ethyl acrylate was added to the obtained mixture, and stirred at room temperature for 5 hours. Thereafter, 3.2 g (8.7 mmol) of a tetrabutylammonium iode and 1.2 g (8.7 mmol) of a potassium carbonate were added thereto, and heated at a 70° C. external temperature for 6 hours. The reaction mixture was poured into water and a product was extracted with ethyl acetate. After ethyl acetate was evaporated, the residue was purified by column chromatography. 0.89 g (1.8 mmol) of a sample compound (1-2) was obtained as a slight yellow solid. The yield was 41%.

Results of identifying the compound obtained accordingly are shown below.

$[\alpha]_D^{25}$–1118° (C 0.10, CHCl$_3$)

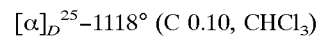

$^1$H-NMR (CDCl$_3$): δ (TMS) 8.08–7.98 (4H, m) 7.86 (2H, d) 7.58–7.40 (6H, m) 6.54 (2H, d) 5.72 (2H, s) 4.32 (4H, q) 1.37 (6H, t)

Example 2

Synthesis of an Optically Active Compound 1-8

1.9 g (4.3 mmol) of an (R)-2,2'-methylenedioxy-6,6'-dibromo-1,1'-binaphtol, 0.3 g (0.43 mmol) of a dichlorobis(triphenylphosphine)palladium(II), 2.9 ml (21 mmol) of a triethylamine, 3.4 g (11 mmol) of a tetrabutylammonium bromide, 1.5 g (11 mmol) of a potassium carbonate, 3 g (9.6 mmol) of a (−)-4-acryloyloxybenzylidene menthone, and 20 ml of a DMF, were mixed and heated at a 100° C. external temperature for 2 hours. After cooling off, the reaction mixture was poured into diluted hydrochloric acid and a product was extracted with ethyl acetate. After the ethyl acetate was evaporated, the residue was purified by column chromatography. 0.65 g (1.1 mmol) of a sample compound (1-8) was obtained as a yellow oil (yield 27%).

Results of identifying the compound obtained accordingly are shown below.

$[\alpha]_D^{25}$ –594° (C 0.10, CHCl$_3$)

$^1$H-NMR (CDCl$_3$): δ(TMS) 8.10 (2H, d) 8.06–8.03 (2H, m) 7.64–7.00 (18H, m) 6.71 (2H, d) 5.74 (2H, s) 3.50–3.30 (2H, m) 2.62–0.76 (30H, m)

Example 3

Synthesis of an Optically Active Compound 1-7

After mixing 0.3 g (0.68 mmol) of an (R)-2,2'-methylenedioxy-6,6'-(2-carboxyethenyl)-1,1'-binaphtol, a small amount of DMF, and 5 ml of a THF, dropping 0.18 ml (2.1 mmol) of an oxalyl chloride thereto, and stirring at room temperature for 1.5 hours, the THF and the excessive oxalyl chloride were removed. The residue was added to a THF solution of a phenolate prepared from 0.26 g (1.3 mmol) of a 4-(4'-methoxyphenyl)phenol and 0.05 g (1.3 mmol) of a 60% hydrogenated sodium. After stirring at room temperature for 30 minutes, the mixture was poured into water and the resulting product was extracted with ethyl acetate. After ethyl acetate was evaporated, the residue was purified by column chromatography. 0.18 g (0.22 mmol) of a sample compound (1-7) was obtained as a colorless solid (yield 33%).

Results of identifying the compound obtained accordingly are shown below.

$[\alpha]_D^{25}$ –715° (C 0.10, CHCl$_3$)

$^1$H-NMR (CDCl$_3$): δ(TMS) 8.15–8.01 (6H, m) 7.65–7.47 (14H, m) 7.24 (4H, d) 6.99 (4H, d) 6.79–6.68 (2H, m) 5.75 (2H, s) 3.84 (6H, s)

Example 4

Synthesis of an Optically Active Compound 1-26

1.0 g of an (R)-6,6'-di(ethoxycarbonylethenyl)-1,1'-bi-2-naphtol, 1.2 ml of a triethylamine, and 10 ml of a THF were mixed. While stirring, 0.3 ml of a phthaloyl chloride was dropped. After stirring at room temperature for 30 minutes, the mixture was poured into a diluted hydrochloric acid, and a product was extracted with ethyl acetate. After evaporating the ethyl acetate, the residue was purified by column chromatography. 0.49 g of a sample compound (1-26) was obtained (yield 41%).

Results of identifying the compound obtained accordingly are shown below.

$[\alpha]_D^{25}$ –620° (C 0.10, CHCl$_3$)

$^1$H-NMR (CDCl$_3$): δ(TMS) 8.10–8.00 (5H, m) 7.90 (1H, d) 7.85 (1H, d) 7.50–7.30 (7H, m) 7.25 (1H, t) 7.00 (1H, d) 6.55 (1H, d) 6.52 (1H, d) 4.30 (4H, q) 1.38 (6H, t)

Example 5

Synthesis of an Optically Active Compound 1-51

The same process as that above was carried out except that the phthaloyl chloride was replaced by 1,1'-biphenyl-2,2'-dicarbonyl chloride so as to obtain a sample compound (1-51) (yield 57%).

Results of identifying the compound obtained accordingly are shown below.

$[\alpha]_D^{25}$ –40° (C 0.10, CHCl$_3$)

$^1$H-NMR (CDCl$_3$): δ(TMS) 8.00–7.90 (4H, m) 7.80 (2H, d) 7.65–7.30 (12H, m) 7.00 (2H, d) 6.45 (2H, d) 4.28 (4H, q) 1.35 (6H, t)

Example 6

Synthesis of an Optically Active Compound 1-34

1.5 g of an (R)-6,6'-di(ethoxycarbonylethenyl)-1,1'-bi-2-naphtol, and 5 ml of a methylene chloride were mixed. The solution of 0.43 ml of phosphorus oxychloride in methylene chloride (3 ml) was dropwisely added to the mixture, and then the solution of 1 ml of triethylamine in methylene chloride (3 ml) was dropwisely added to the mixture. The reaction product was stirred at room temperature for 4 hours. The reaction mixture was poured into a 0.6 ml of a methanol solution of a triethylamine, and stirred the mixture at room temperature for 1.5 hours. After evaporating the methanol, the residue was extracted with ethyl acetate and water. After condensing the ethyl acetate layer, the residue was purified by column chromatography. 0.54 g of a sample compound (1-34) was obtained (yield 32%).

Results of identifying the compound obtained accordingly are shown below.

$[\alpha]_D^{25}$ –710° (C 0.10, CHCl$_3$)

1H-NMR (CDCl$_3$): δ(TMS) 8.20–8.00 (4H, m) 7.84 (2H, d) 7.65–7.22 (6H, m) 6.50 (2H, d) 4.25 (4H, q) 4.00 (3H, d) 1.35 (6H, t)

Example 7

Photoreactive Chiral Agent

For the sample compound (1-2), the function as a photoreactive chiral agent was confirmed as follows.

2 parts of the sample compound (1-2) was mixed with 98 parts of a nematic liquid crystal composition (ZLI-1132, produced by Merck Corp.), and the mixture was injected into a wedge type cell (glass thickness: 1.1 mm, blue plate) with a polyimide orientation film which had been subjected to one axis orientation process. The helical pitch at room temperature measured using a polarization microscope was 0.59 μm. Helical twisting power (HTP) obtained by the above-mentioned formula and the helical pitch was 86 μm$^{-1}$.

Next, to the wedge type cell, an ultraviolet light was irradiated by a high pressure mercury lamp with a 300 mW/cm$^2$ irradiation intensity for 6 minutes. After the irradiation, the helical pitch at room temperature measured again in the same manner as mentioned above was found to be 3.53 μm. HTP obtained by the above-mentioned formula and the helical pitch was 14 μm$^{-1}$. Therefore, the HTP change ratio is 6.1.

As is seen from the above example, the helical twisting power (HTP) can be changed significantly by getting smaller (the helical pitch gets larger) due to the ultraviolet light irradiation. When the twist orientation was checked before and after the ultraviolet light irradiation by the contact method, it was found to be rightward twisting both before and after the irradiation.

Example 8

Photoreactive Chiral Agent

Example 8 was carried out in the same manner as in the example 7 except that 0.5 part of the sample compound (1-26) was used instead of 2 parts of the sample compound (1-2), and 99.5 parts of the nematic liquid crystal composition (ZLI-1132, produced by Merck Corp.) was used instead of 98 parts, and a liquid crystal composition was thus prepared. The helical pitch was measured before and after the ultraviolet light irradiation and the HTP was obtained.
(before the irradiation) helical pitch: 1.98 μm, HTP: 101 μm$^{-1}$
(after the irradiation) helical pitch: 18.1 μm, HTP: 11 μm$^{-1}$
The HTP change ratio was 9.2.

Example 9

Photoreactive Chiral Agent

Example 9 was carried out in the same manner as in the example 7 except that 0.5 part of the sample compound (1-51) was used instead of 2 parts of the sample compound (1-2), and 99.5 parts of the nematic liquid crystal composition (ZLI-1132, produced by Merck Corp.) was used instead of 98 parts, and a liquid crystal composition was thus prepared. The helical pitch was measured before and after the ultraviolet light irradiation and the HTP was obtained.
(before the irradiation) helical pitch: 1.81 gm, HTP: 110 μm$^{-1}$
(after the irradiation) helical pitch: 16.3 μm, HTP: 12 μm$^{-1}$
The HTP change ratio was 9.2.

Example 10

Photoreactive Chiral Agent

Example 10 was carried out in the same manner as in the example 7 except that 0.5 part of the sample compound (1-34) was used instead of 2 parts of the sample compound (1-2), and 99.5 parts of the nematic liquid crystal composition (ZLI-1132, produced by Merck Corp.) was used instead of 98 parts, and a liquid crystal composition was thus prepared. The helical pitch was measured before and after the ultraviolet light irradiation and the HTP was obtained.
(before the irradiation) helical pitch: 2.57 μm, HTP: 78 μm$^{-1}$
(after the irradiation) helical pitch: 21.3 μm, HTP: 9.4 μm$^{-1}$
The HTP change ratio was 8.0.

Example 11

Wide Band Circular Polarization Reflection Plate
(1) Preparation of a Substrate

A coating liquid for a polyimide orientation film (LX-1400, produced by Hitachi Kasei Dupont Corp.) was coated on a glass substrate by a spin coater, and dried for 5 minutes in an oven at 100° C. Then, it was baked for 1 hour in the oven at 250° C. so as to form an orientation film. Furthermore, the surface of the film was subjected to an orientation process (a rubbing process).

(2) Production

On the orientation film on the glass substrate, a coating liquid prepared by the below-mentioned prescription was coated by a bar coater. After maintaining the same on a hot plate at 110° C. for 5 minutes, the light irradiation was executed for 7 minutes at that temperature by a super high pressure mercury lamp via a band pass filter which transmits light having a center wavelength of 365 nm.

Then, it was kept for 5 minutes in a dark place with the temperature maintained at 110° C. Thereafter, the band pass filter was removed, and the entire surface was further exposed by a 500 mJ/cm$^2$ irradiation energy using the same super high pressure mercury lamp while blowing nitrogen gas to thereby carry out polymerization hardening, Accordingly, a circular polarization reflection plate was produced.

[prescription of the coating liquid]

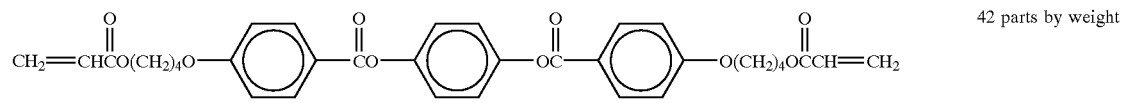

42 parts by weight

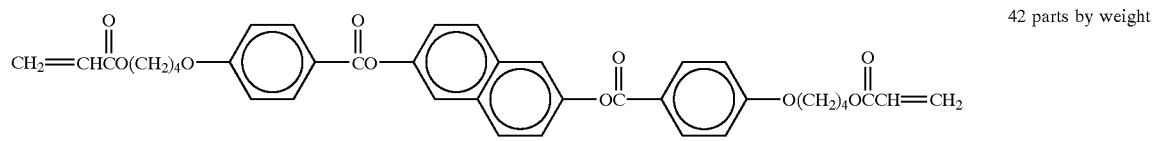

42 parts by weight sample compound 1-2

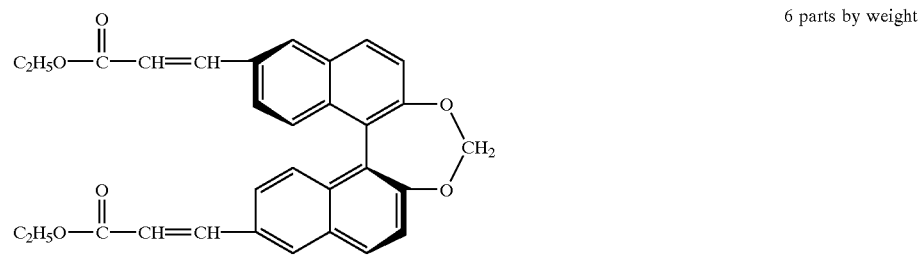

6 parts by weight

| [prescription of the coating liquid] | |
|---|---|
| 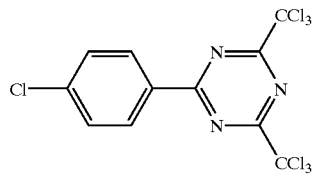 | 2 parts by weight |
| 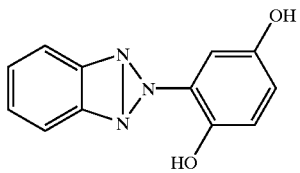 | 5 parts by weight |
| chloroform | 400 parts by weight |

The circular polarization reflection plate accordingly obtained has selective reflection in a wide wavelength region at from 450 to 630 nm, and a band characteristic sufficient for a wide band circular reflection plate. Furthermore, the right circular polarization reflection ratio at a 550 nm selective reflection wavelength was 98%.

Example 12

Liquid Crystal Color Filter
(1) Preparation of a Filter Substrate

A coating liquid for a polyimide orientation film (LX-1400, produced by Hitachi Kasei Dupont Corp.) was coated on a glass substrate by a spin coater, and dried for 5 minutes in an oven at 100° C. Then, it was baked for 1 hour in the oven at 250° C. so as to form an orientation film. Furthermore, the surface of the film was subjected to an orientation process (a rubbing process).

(2) Formation of a Filter Layer

On the orientation film thus obtained, a coating liquid for a photosensitive resin layer prepared by the below-mentioned prescription was coated by a spin coater. After drying the same in the oven at 100° C. for 2 minutes, a photosensitive resin layer was formed.

| [prescription of the coating liquid] | |
|---|---|
| 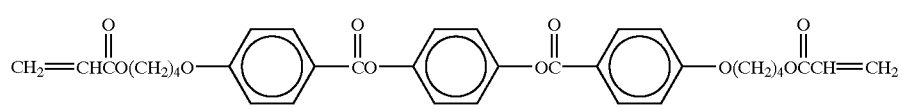 | 42 parts by weight |
| 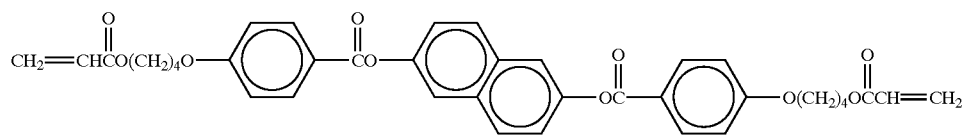 | 42 parts by weight |
| 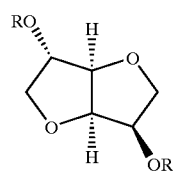 | 12 parts by weight |
| 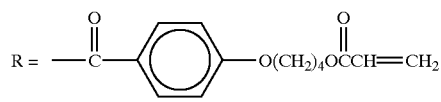 | |

-continued

[prescription of the coating liquid]

sample compound 1-7

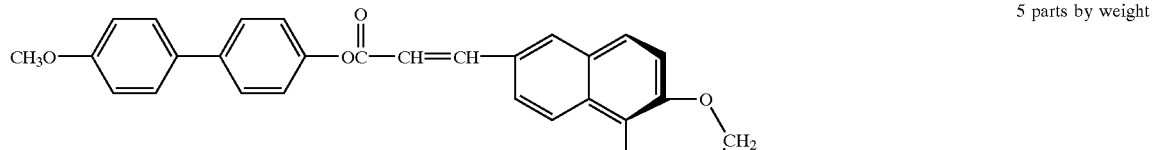

5 parts by weight

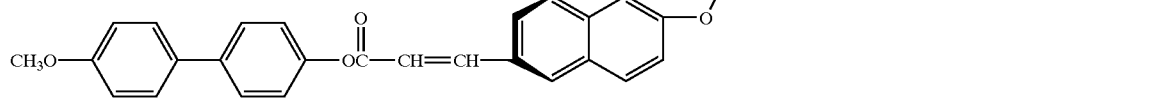

2 parts by weight

dipentaerythritol hexaacrylate   3 parts by weight
chloroform   400 parts by weight Next, the photosensitive resin layer was maintained at 100° C. for 5 minute on a hot plate such that the surface of the glass substrate contacted the hot plate to form color in the photosensitive resin layer. Furthermore, a super high pressure mercury lamp was disposed above the photosensitive resin layer via a photo mask having three different transmission rates (0%, 46%, 92%) with each region arranged corresponding to the red pixel, the green pixel, and the blue pixel, and a band pass filter having a central wavelength of 365 nm. Through the photo mask and the band pass filter, light was irradiated using the super high pressure mercury lamp to carry out patterning. The irradiation energy at the time was 600 mJ/cm$^2$ with respect to the blue pixel, and the irradiation intensity was 30 mW/cm$^2$.

Next, the photo mask and the band pass filter were removed, and the entire surface was further exposed by a 500 mJ/cm$^2$ irradiation energy using the same super high pressure mercury lamp while blowing nitrogen gas for polymerization hardening. Furthermore, it was baked for 20 minutes in the oven at 220° C. for promoting the hardening of the filter portion (photosensitive resin layer) so as to obtain a color filter with the red pixel, green pixel, and blue pixel patterns formed.

At the time of patterning, the liquid crystal helical pitch (liquid crystal helical twisting power) can be changed significantly by the irradiation, and thus a pixel pattern including red, green and blue colors can be formed with a high color purity.

Example 13

Liquid Crystal Color Filter

Example 13 was carried out in the same maner as in the example 12 except that the prescription of the coating liquid for a photosensitive resin layer was changed to the that below in (2) filter layer formation of the example 12, and a photosensitive resin layer was thus produced. By color development, polymerization hardening, and patterning, a color filter was obtained. Similarly, a pixel pattern comprising red, green, and blue colors with a high color purity, capable of significantly changing the liquid crystal helical pitch was formed.

[prescription of the coating liquid]

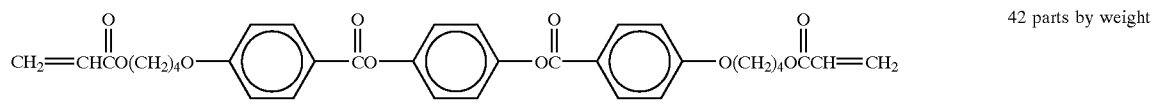

42 parts by weight

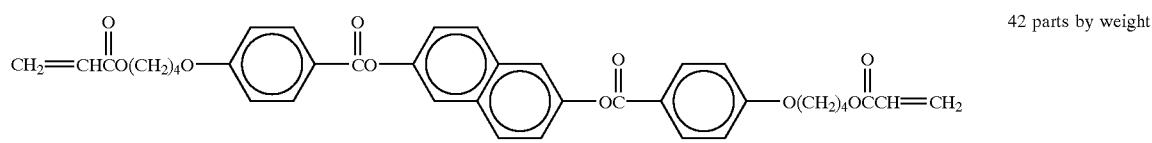

42 parts by weight

-continued

| [prescription of the coating liquid] | |
|---|---|
| 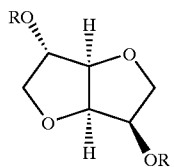 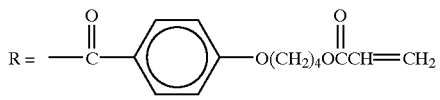 (sample compound 1-26) | 2 parts by weight |
| 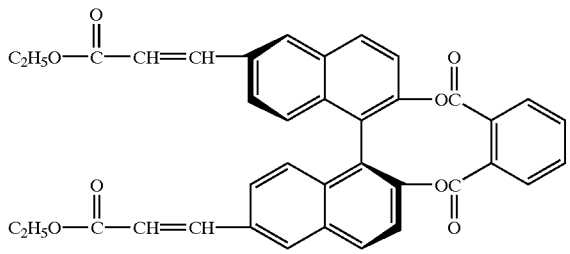 | 4 parts by weight |
| 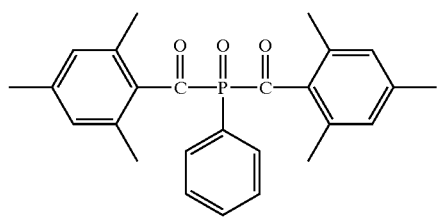 | 2 parts by weight |
| dipentaerythritol hexaacrylate | 3 parts by weight |
| chloroform | 400 parts by weight |

Example 14

Optical Compensation Film for an STN Element

A polyethylene vinyl alcohol (PVA) film of a 99.5% saponification degree was formed on triacetyl cellulose (TAC) having a thickness of 80 μm by a bar coat method, and heated for 3 minutes at 110° C. The PVA film was subjected to a rubbing process, and furthermore, a coating liquid prepared by the following prescription was coated by a bar coater while heating. It was then dried for 3 minutes in an oven at 120° C. so as to form a film.

| [prescription of the coating liquid] | |
|---|---|
| 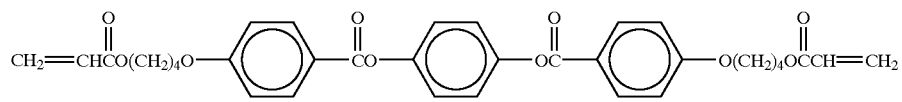 | 42 parts by weight |
| 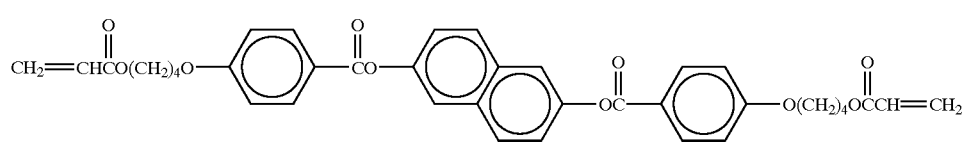 sample compound 1-8 | 42 parts by weight |

-continued

[prescription of the coating liquid]

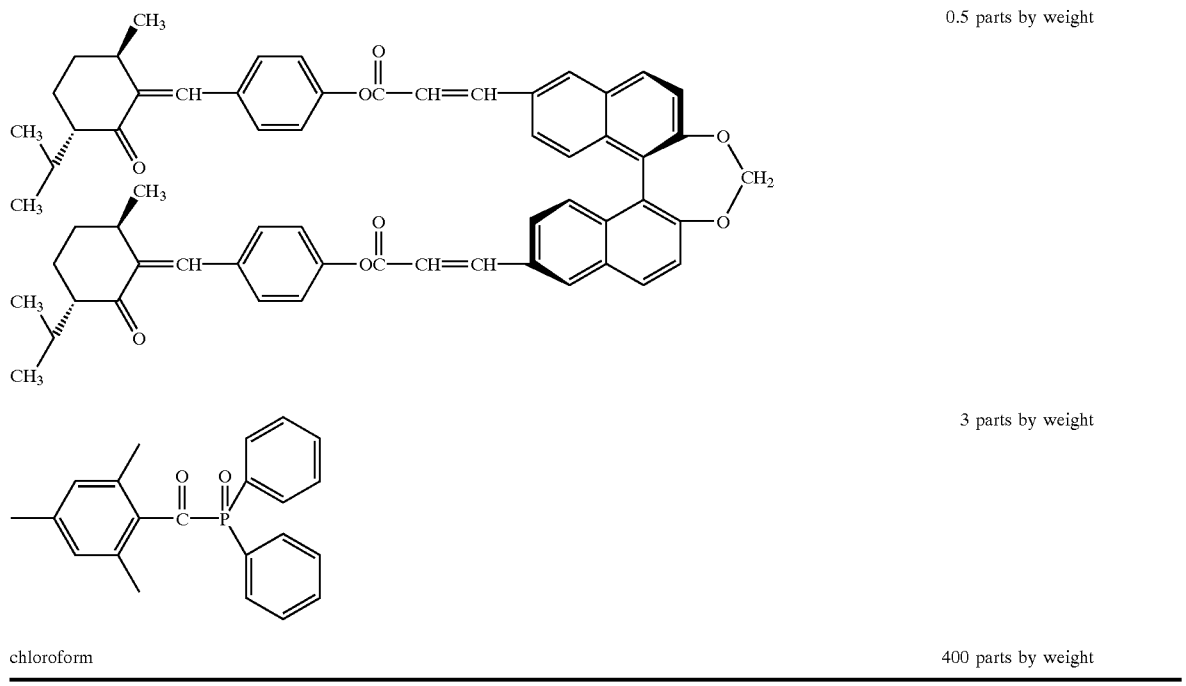

0.5 parts by weight 3 parts by weight chloroform 400 parts by weight

Next, at a 100° C. temperature, the film was polymerized and cured by the ultraviolet light irradiation (irradiation energy 300 mJ/cm$^2$) using a super high pressure mercury lamp disposed above the film so as to produce an optical compensation film for an STN element (hereinafter referred to as an "STN compensation film"). The measured film thickness of the STN compensation film was 5.0 μm. Moreover, according to the polarized light transmission spectrum profile of the STN compensation film, it was found that the liquid crystal molecule orientation (helical structure) was 240 degrees, and was twisted in the film thickness direction, with the helical twist angle (rotation angle) being 240 degrees.

Furthermore, an STN compensation film having the twist angle opposite to the film (−240 degrees) was prepared. They were superimposed such that the liquid crystal molecules of the portions opposite to each other were disposed orthogonal to each other, and inserted between two polarizing plate with the absorption axes orthogonal to each other. The film was observed and found to have a favorable black color. Therefore, it was confirmed that the film formed as mentioned above (STN compensation film) functions as an optical compensation film for an STN element.

Example 15

TN Type Liquid Crystal Display Device

A glass substrate having an ITO film was prepared and a coating liquid for a polyimide orientation film (LX-1400, produced by Hitachi Kasei Dupont Corp.) was coated by a spin coater on the ITO film on the glass substrate, and dried for 5 minutes in an oven at 100° C. Then, it was baked for 1 hour in the oven at 250° C. so as to form an orientation film. Furthermore, the surface of the film was subjected to an orientation process (a rubbing process) so as to have a 90 degree rubbing angle for producing two glass substrates with an orientation film.

The glass substrates having an orientation film were disposed with the orientation films facing each other, and bonded by two-liquid-component epoxy resin adhesive having mixed therein spacer beads with a 6 μm diameter so as to form a driving cell. The cell thickness measured by a light interference method was 5.4 μm.

The composition below was injected into the above-mentioned cell.

Composition nematic liquid crystal composition (ZLI-1132, produced by Merc Corp.) 99.9% photoreactive chiral agent of the present invention (the above-mentioned sample compound 1-2) 0.1%

Next, the driving cell after being injected with the composition was inserted between two polarizing plates with the absorbing axes orthogonal to each other. Generation of a reverse twist domain was not observed. Therefore, an image display with excellent contrast and color purity can be obtained without deterioration of the contrast due to generation of the reverse twist.

What is claimed is:

1. An optically active compound represented by the following general formula (1).

general formula (1)

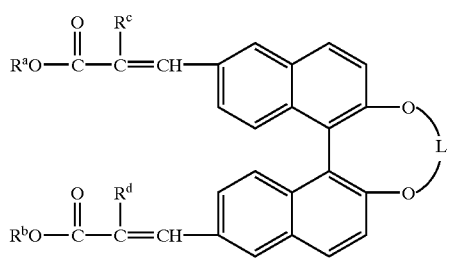

wherein, $R^a$ and $R^b$ each independently denotes a hydrogen atom, an alkyl group, an aryl group, a heterocyclic group, an alkenyl group, or an alkynyl group, $R^c$ and $R^d$ each independently denotes a hydrogen atom, an alkyl group, or an alkoxycarbonyl group, and L denotes a divalent group and a binaphtyl portion has an axial asymmetry of either (R) or (S).

2. A photoreactive chiral agent including the optically active compound according to claim 1.

3. A liquid crystal composition containing at least a liquid crystal compound and the optically active compound according to claim 1.

4. A liquid crystal composition containing a liquid crystal compound having at least one polymerizable group, a photo polymerization initiator, and the optically active compound according to claim 1.

5. The liquid crystal composition according to claim 4, wherein the photo polymerization initiator and the optically active compound according to claim 1 have different photosensitive wavelength regions.

6. A method for changing the helical structure of the liquid crystal by irradiating light onto the liquid crystal composition according to claim 3 so as to change the structure of the optically active compound.

7. A method for changing the helical structure of the liquid crystal by irradiating light onto the liquid crystal composition according to claim 4 so as to change the structure of the optically active compound.

8. A method for changing the helical structure of the liquid crystal by irradiating light onto the liquid crystal composition according to claim 5 so as to change the structure of the optically active compound.

9. A method for fixing the helical structure of the liquid crystal comprising the steps of irradiating light of the photosensitive wavelength region of the optically active compound image-wise onto the liquid crystal composition according to claim 4, and irradiating light of the photosensitive wavelength region of the photo polymerization initiator so as to carry out the photo polymerization.

10. A method for fixing the helical structure of the liquid crystal comprising the steps of irradiating light of the photosensitive wavelength region of the optically active compound image-wise onto the liquid crystal composition according to claim 5, and irradiating light of the photosensitive wavelength region of the photo polymerization initiator so as to carry out the photo polymerization.

11. A liquid crystal color filter containing at least a liquid crystal compound and the optically active compound according to claim 1.

12. An optical film containing at least a liquid crystal compound and the optically active compound according to claim 1.

13. A recording medium containing at least a liquid crystal compound and the optically active compound according to claim 1.

* * * * *